United States Patent
Whitman et al.

(10) Patent No.: US 11,123,869 B2
(45) Date of Patent: Sep. 21, 2021

(54) ROBOTICALLY NEGOTIATING STAIRS

(71) Applicant: Boston Dynamics, Inc., Waltham, MA (US)

(72) Inventors: Eric Whitman, Arlington, MA (US); Gina Christine Fay, Waltham, MA (US); Benjamin Swilling, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days.

(21) Appl. No.: 17/157,298

(22) Filed: Jan. 25, 2021

(65) Prior Publication Data

US 2021/0138650 A1     May 13, 2021

Related U.S. Application Data

(63) Continuation of application No. 16/382,390, filed on Apr. 12, 2019.

(51) Int. Cl.
    *G06F 17/00*        (2019.01)
    *B25J 9/16*          (2006.01)
    (Continued)

(52) U.S. Cl.
    CPC .......... *B25J 9/1666* (2013.01); *B62D 57/024* (2013.01); *B62D 57/032* (2013.01)

(58) Field of Classification Search
    CPC .... B25J 9/1666; B62D 57/032; B62D 57/024; B60W 60/00
    (Continued)

(56) References Cited

U.S. PATENT DOCUMENTS

| 5,378,969 A | 1/1995 | Haikawa |
| 5,402,050 A | 3/1995 | Ozawa |

(Continued)

FOREIGN PATENT DOCUMENTS

| CN | 103273984 A | 9/2013 |
| CN | 103273985 A | 9/2013 |

(Continued)

OTHER PUBLICATIONS

International Search Report, PCT/US2019/047928, dated Jan. 3, 2020, 15 pages.

(Continued)

*Primary Examiner* — Ronnie M Mancho
(74) *Attorney, Agent, or Firm* — Honigman LLP; Brett A. Krueger

(57) ABSTRACT

A method for negotiating stairs includes receiving image data about a robot maneuvering in an environment with stairs. Here, the robot includes two or more legs. Prior to the robot traversing the stairs, for each stair, the method further includes determining a corresponding step region based on the received image data. The step region identifies a safe placement area on a corresponding stair for a distal end of a corresponding swing leg of the robot. Also prior to the robot traversing the stairs, the method includes shifting a weight distribution of the robot towards a front portion of the robot. When the robot traverses the stairs, the method further includes, for each stair, moving the distal end of the corresponding swing leg of the robot to a target step location where the target step location is within the corresponding step region of the stair.

20 Claims, 19 Drawing Sheets

(51) Int. Cl.
  *B62D 57/024* (2006.01)
  *B62D 57/032* (2006.01)
(58) Field of Classification Search
  USPC .......................................................... 700/255
  See application file for complete search history.

(56) References Cited

U.S. PATENT DOCUMENTS

| | | | |
|---|---|---|---|
| 5,737,217 | A | 4/1998 | Nishikawa et al. |
| 5,838,130 | A | 11/1998 | Ozawa |
| 5,974,366 | A | 10/1999 | Kawai et al. |
| 6,021,363 | A | 2/2000 | Nishikawa et al. |
| 6,527,071 | B1 | 3/2003 | Villedieu |
| 7,653,216 | B2 | 1/2010 | Kanade et al. |
| 7,878,276 | B2 * | 2/2011 | Limbacher, Jr. ...... B62D 57/024 180/8.1 |
| 8,289,321 | B2 * | 10/2012 | Gutmann ................. G06T 7/13 345/423 |
| 8,457,830 | B2 | 6/2013 | Goulding |
| 8,630,763 | B2 | 1/2014 | Goulding |
| 9,089,968 | B2 | 7/2015 | Goulding |
| 9,446,518 | B1 * | 9/2016 | Blankespoor .......... B62D 57/00 |
| 9,488,987 | B2 | 11/2016 | Goulding |
| 9,499,218 | B1 | 11/2016 | Stephens |
| 9,527,538 | B2 | 12/2016 | Kaneko et al. |
| 9,849,926 | B2 * | 12/2017 | Saunders ............... B62D 57/032 |
| 9,868,210 | B1 * | 1/2018 | Whitman ............. B62D 57/032 |
| 9,975,245 | B1 | 5/2018 | Whitman |
| 10,099,378 | B2 * | 10/2018 | Kaneko .................. B25J 9/1694 |
| 10,126,757 | B2 | 11/2018 | Goulding |
| 2011/0208444 | A1 * | 8/2011 | Solinsky .............. A61B 5/1122 702/41 |
| 2011/0231050 | A1 * | 9/2011 | Goulding ............. G05D 1/0891 701/26 |
| 2013/0116820 | A1 * | 5/2013 | Lee ....................... B62D 57/032 700/254 |
| 2015/0073592 | A1 * | 3/2015 | Kaneko ................ B62D 57/032 700/245 |
| 2020/0324412 | A1 * | 10/2020 | Whitman ............. G05D 1/0246 |
| 2021/0041887 | A1 * | 2/2021 | Whitman ............. G05D 1/0238 |

FOREIGN PATENT DOCUMENTS

| | | |
|---|---|---|
| JP | S63176720 A | 7/1988 |
| JP | H07166974 A | 6/1995 |
| JP | 2003340763 A | 12/2003 |
| JP | 2004181600 A | 7/2004 |
| JP | 2013072813 A | 4/2013 |
| JP | 2013237126 A | 11/2013 |
| JP | 2015054391 A | 3/2015 |
| JP | 2015080832 A | 4/2015 |
| KR | 20100093833 A | 8/2010 |
| KR | 20100093834 A | 8/2010 |
| WO | 2005087452 A1 | 9/2005 |
| WO | 2012086604 A1 | 6/2012 |

OTHER PUBLICATIONS

Orsolino et al., Feasible Region: an Actuation-Aware Extension of the Support Region, Mar. 19, 2019, 19 pages.

* cited by examiner

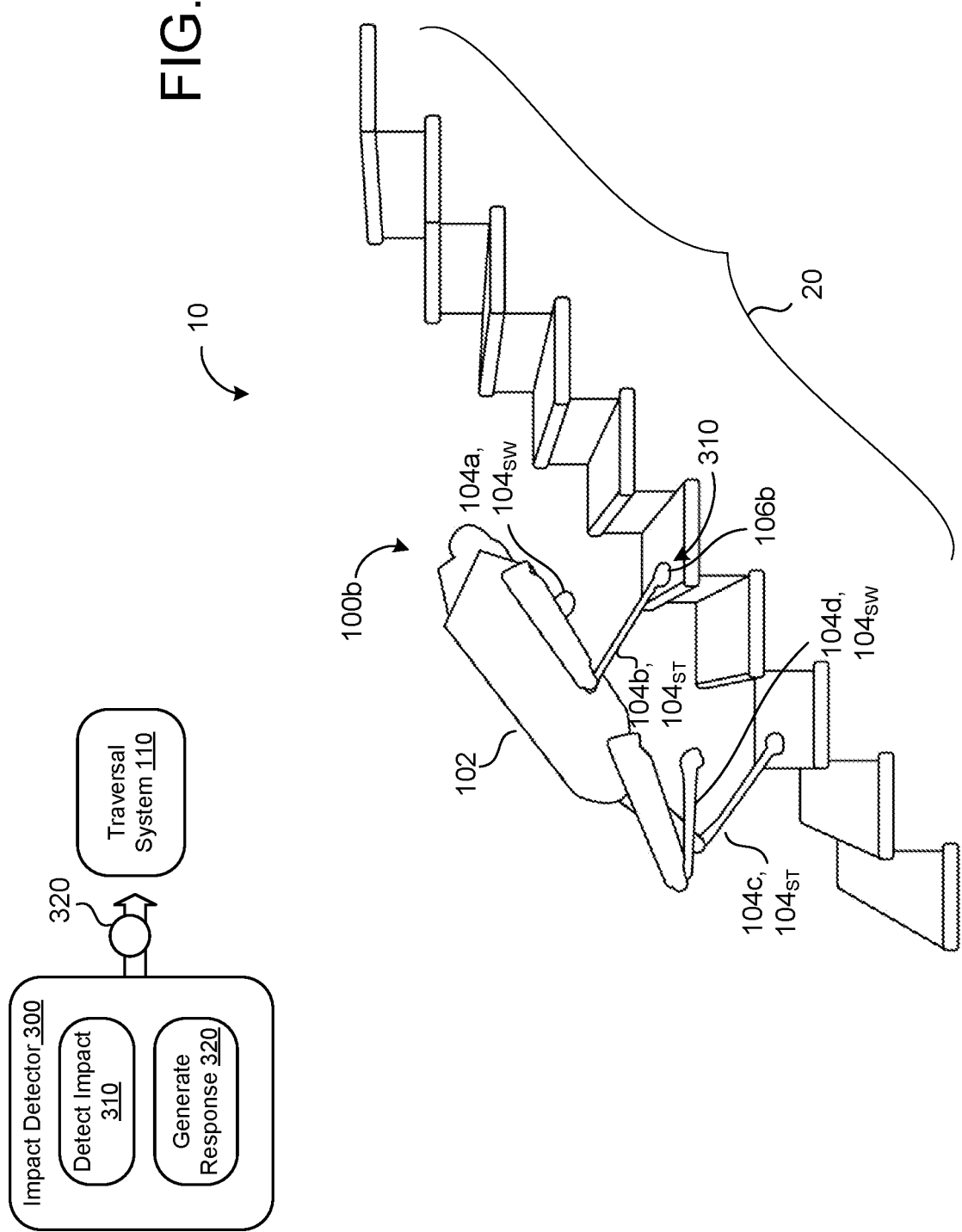

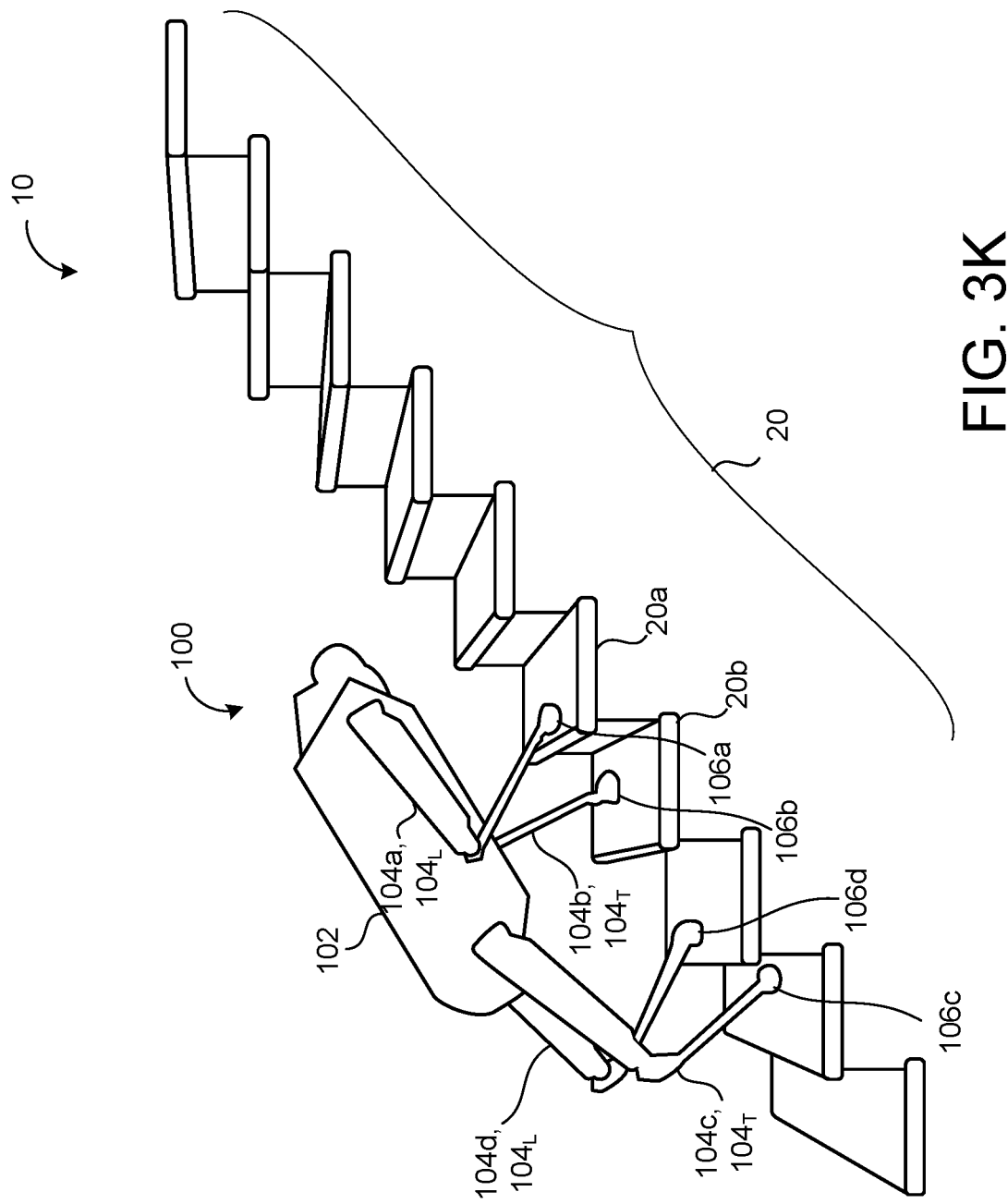

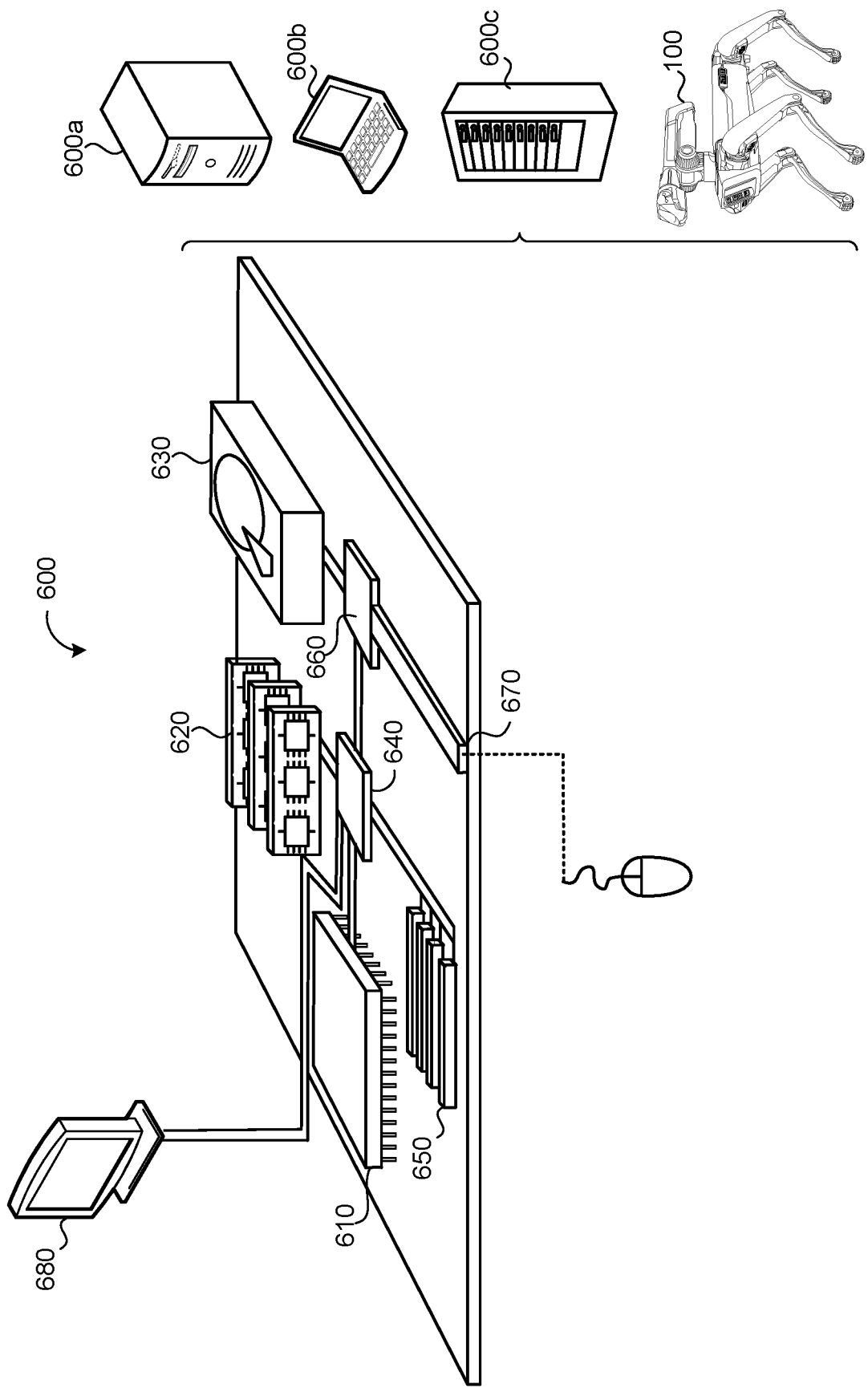

ROBOTICALLY NEGOTIATING STAIRS

CROSS-REFERENCE TO RELATED APPLICATIONS

This application claims priority under 35 U.S.C. § 120 to U.S. patent application Ser. No. 16/382,390, filed on Apr. 12, 2019. The disclosure of this prior application is considered part of the disclosure of this application and is hereby incorporated by reference in its entirety.

TECHNICAL FIELD

This disclosure relates to robots negotiating stairs.

BACKGROUND

A robot is generally defined as a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., using legs, wheels, or traction based mechanisms), or some combination of a manipulator and a mobile robot. Robots are utilized in a variety of industries including, for example, manufacturing, transportation, hazardous environments, exploration, and healthcare. As such, the ability of robots to traverse environments with obstacles or features requiring various means of coordinated leg movement provides additional benefits to such industries.

SUMMARY

One aspect of the disclosure provides a method for negotiating stairs. The method includes receiving, at data processing hardware, image data about a robot maneuvering in an environment with stairs. Here, the robot includes two or more legs. Prior to the robot traversing the stairs, for each stair, the method further includes determining, by the data processing hardware, a corresponding step region based on the received image data. The step region identifies a safe placement area on a corresponding stair for a distal end of a corresponding swing leg of the robot. Also prior to the robot traversing the stairs, the method includes shifting, by the data processing hardware, a weight distribution of the robot towards a front portion of the robot. When the robot traverses the stairs, the method additionally includes, for each stair, moving, by the data processing hardware, the distal end of the corresponding swing leg of the robot to a target step location where the target step location is within the corresponding step region of the stair.

Implementations of the disclosure may include one or more of the following optional features. In some implementations, prior to the robot traversing the stairs, the method further includes identifying, by the data processing hardware, a corresponding collision region for each stair. Here, the collision region corresponds to a region of the corresponding stair that the legs of the robot should avoid when the robot traverses the stairs. In some of these implementations, when the robot traverses the stairs, the method may include adjusting, by the data processing hardware, a body height of the center of mass of the robot with respect to a surface of the stairs and a pitch of the robot about a longitudinal axis defined along the body of the robot where the adjustment of the body height and the pitch are based on the corresponding collision region identified for each stair.

In other of these implementations, when the robot traverses the stairs, the method may include identifying, by the data processing hardware, corresponding leg kinematics for each leg of the robot and adjusting, by the data processing hardware, a body height of the center of mass of the robot with respect to a surface of the stairs and a pitch of the robot about a longitudinal axis defined along the body of the robot where the adjustment of the body height and the pitch are based on the corresponding collision region identified for each stair and the corresponding leg kinematics for each leg of the robot.

In some examples, while moving the distal end of the corresponding swing leg to the target location, the method includes detecting, by the data processing hardware, that the distal end of the corresponding swing leg of the robot contacts the corresponding stair at the target step location and based on the detection, classifying, by the data processing hardware, the corresponding swing leg of the robot as a stance leg.

In some configurations, while moving the distal end of the corresponding swing leg to the target step location, the method includes detecting, by the data processing hardware, that a knee joint of a trailing leg of the robot contacts an object behind a body of the robot. Based on the detection, the method includes moving, by the data processing hardware, the knee joint of the trailing leg forward beneath the body of the robot.

In some implementations, while moving the distal end of the corresponding swing leg to the target step location, the method includes detecting, by the data processing hardware, an impact between the corresponding swing leg of the robot and a contralateral stance leg of the robot. In these implementations, based on the detected impact, the method further includes shifting, by the data processing hardware, the distal end of the corresponding swing leg of the robot away from the contralateral stance leg of the robot to an adjusted step location where the adjusted step location is within the corresponding step region of the stair and is shifted relative to the target step location.

In some configurations, while moving the distal end of the corresponding swing leg to the target step location the method includes detecting, by the data processing hardware, a trip condition of the corresponding swing leg of the robot that causes instability of the robot. In these configurations, based on the detected trip condition, the method further includes elevating, by the data processing hardware, the distal end of the corresponding swing leg.

Optionally, prior to the robot traversing the stairs, the method also includes selecting, by the data processing hardware, a movement controller for traversing the stairs with a fixed cadence where the fixed cadence is based on the corresponding step region determined for each stair. The corresponding step region determined for each stair may be associated with a tread portion of the corresponding stair. In some examples, when moving the distal end of the corresponding swing leg of the robot to the target step location, the method may include positioning, by the data processing hardware, a distal end of a stance leg to a trailing stair where the trailing stair is located at one of below the stair associated with the target step location for the corresponding swing leg when the robot is ascending the stairs or above the stair associated with the target step location for the corresponding swing leg when the robot is descending the stairs. Here, the movement by the distal end of the corresponding swing leg of the robot and movement by the distal end of the trailing leg of the robot may occur in a fixed cadence.

Another aspect of the disclosure provides a robot for negotiating stairs. The robot includes a body, two or more legs coupled to the body and configured to traverse an environment with stairs, and a movement controller in communication with the two or more legs. The movement controller includes data processing hardware and memory hardware in communication with the data processing hardware. The memory hardware stores instructions that when executed on the data processing hardware cause the data processing hardware to perform operations. The operations include receiving image data about a robot maneuvering in an environment with stairs. Prior to the robot traversing the stairs, for each stair, the operations further include determining a corresponding step region based on the received image data. The step region identifies a safe placement area on a corresponding stair for a distal end of a corresponding swing leg of the robot. Also prior to the robot traversing the stairs, the operations include shifting a weight distribution of the robot towards a front portion of the robot. When the robot traverses the stairs, the operations additionally include, for each stair, moving the distal end of the corresponding swing leg of the robot to a target step location where the target step location is within the corresponding step region of the stair.

This aspect may include one or more of the following optional features. In some implementations, prior to the robot traversing the stairs, the operations further include identifying a corresponding collision region for each stair. Here, the collision region corresponds to a region of the corresponding stair that the legs of the robot should avoid when the robot traverses the stairs. In these implementations, when the robot traverses the stairs, the operations may include adjusting a body height of the center of mass of the robot with respect to a surface of the stairs and a pitch of the robot about a longitudinal axis defined along the body of the robot where the adjustment of the body height and the pitch are based on the corresponding collision region identified for each stair. In other of these implementations, when the robot traverses the stairs, the operations may include identifying corresponding leg kinematics for each leg of the robot and adjusting a body height of the center of mass of the robot with respect to a surface of the stairs and a pitch of the robot about a longitudinal axis defined along the body of the robot where the adjustment of the body height and the pitch are based on the corresponding collision region identified for each stair and the corresponding leg kinematics for each leg of the robot.

In some examples, while moving the distal end of the corresponding swing leg to the target location, the operations include detecting that the distal end of the corresponding swing leg of the robot contacts the corresponding stair at the target step location and based on the detection, classifying the corresponding swing leg of the robot as a stance leg.

In some configurations, while moving the distal end of the corresponding swing leg to the target step location, the operations include detecting that a knee joint of a trailing leg of the robot contacts an object behind a body of the robot. Based on the detection, the operations include moving the knee joint of the trailing leg forward beneath the body of the robot.

In some implementations, while moving the distal end of the corresponding swing leg to the target step location, the operations include detecting an impact between the corresponding swing leg of the robot and a contralateral stance leg of the robot. In these implementations, based on the detected impact, the operations further include shifting the distal end of the corresponding swing leg of the robot away from the contralateral stance leg of the robot to an adjusted step location where the adjusted step location is within the corresponding step region of the stair and is shifted relative to the target step location.

In some configurations, while moving the distal end of the corresponding swing leg to the target step location the operations include detecting a trip condition of the corresponding swing leg of the robot that causes instability of the robot. In these configurations, based on the detected trip condition, the operations further include elevating the distal end of the corresponding swing leg.

Optionally, prior to the robot traversing the stairs, the operations also include selecting a movement controller for traversing the stairs with a fixed cadence where the fixed cadence is based on the corresponding step region determined for each stair. The corresponding step region determined for each stair may be associated with a tread portion of the corresponding stair. In some examples, when moving the distal end of the corresponding swing leg of the robot to the target step location, the operations may include positioning a distal end of a stance leg to a trailing stair where the trailing stair is located at one of below the stair associated with the target step location for the corresponding swing leg when the robot is ascending the stairs or above the stair associated with the target step location for the corresponding swing leg when the robot is descending the stairs. Here, the movement by the distal end of the corresponding swing leg of the robot and movement by the distal end of the trailing leg of the robot may occur in a fixed cadence.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 3A-3K are perspective views of examples of the robot of FIG. 1A as the robot traverses stairs in the robotic environment.

FIG. 6 is a schematic view of an example computing device that may be used to implement the systems and methods described herein.

Like reference symbols in the various drawings indicate like elements.

DETAILED DESCRIPTION

As legged-robots maneuver about environments, the robots may encounter terrain (e.g., human-made structures) that requires precise leg movement and foot placement (i.e., distal end placement). To provide precise leg movement and foot placement, when systems of the robot recognize different types of terrain, the movement control systems of the robot may constrain the robot's movement to traverse the terrain in order to prevent mistakes, even small mistakes, which may lead to catastrophic issues for the robot. For example, when humans traverse stairs, this task requires a degree of coordination (e.g., eye-to-foot coordination). Without the coordination, a human may misstep, slip, trip, or fall on the stairs. Robots may encounter the same misfortunes, but lack natural coordination. Therefore, robots need systems and methods to coordinate precise leg movements.

Figure 1A:
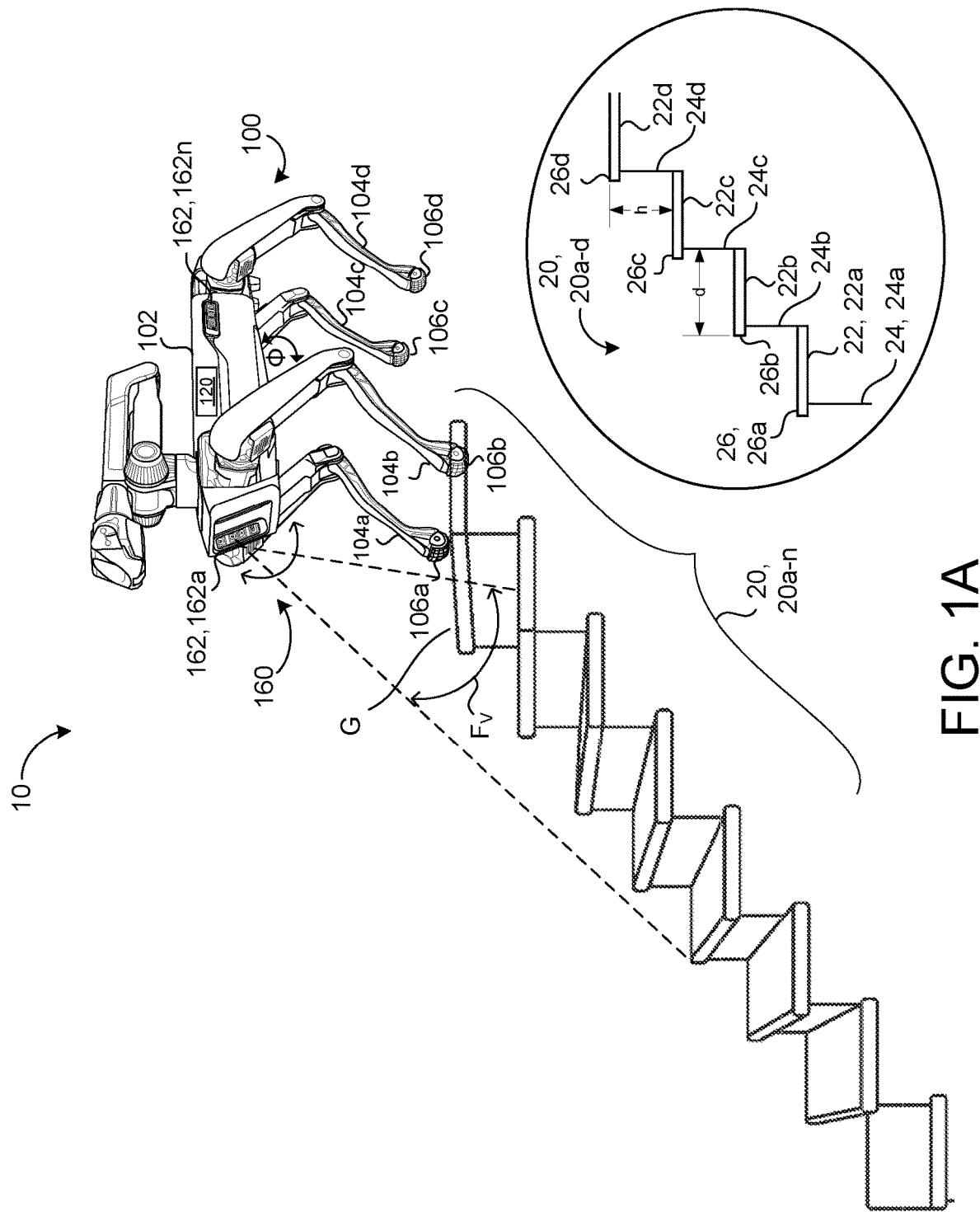
FIG. 1A is a perspective view of an example robot within a robotic environment.

FIG. 1A is an example of an environment 10 for a robot 100. The environment 10 generally refers to a spatial area associated with some type of terrain including stairs 20, 20a-n or stair-like terrain that may be traversed by the robot 100 according to a traversal system 110. The traversal system 110 is responsible for coordinating and/or moving the robot 100 about the environment 10. As the robot 100 traverses stairs 20 or stair-like terrain and moves about the environment 10, the traversal system 110 may analyze the terrain, plan motion trajectories for the robot 100 (e.g., with a path generator 130, a step planner 140, a body planner 150), and/or instruct the robot 100 to perform various movements (e.g., with a controller 120). The traversal system 110 may use various systems of the robot 100 to attempt to successfully traverse the environment 10 while avoiding collisions C and/or damage to the robot 100 or the robot's environment 10.

Stairs 20, 20a-n generally refer to a group of more than one stair 20 (i.e., a group of n stairs 20) designed to bridge a vertical distance. To bridge the vertical distance, stairs 20a-n typically run a horizontal distance with a given rise in vertical height over a pitch (or pitch line). Each stair 20 traditionally includes a tread 22 and a riser 24. The tread 22 of a stair 20 refers to a horizontal part of the stair 20 that is stepped on while a riser 24 refers to a vertical portion of the stair 20 between each tread 22. The tread 22 of each stair 20 spans a tread depth "d" measuring from an outer edge of a stair 20 to the riser 24 between stairs 20. For a residential, a commercial, or an industrial structure, some stairs 20 also include nosing 26 as part of building code for safety purposes. Nosing 26, as shown in FIG. 1A, is a part of the tread 22 that protrudes over a riser 24 beneath the tread 22. For example, the nosing 26a is part of the tread 22a and protrudes over the riser 24a.

Stair-like terrain more generally refers to terrain that varies in height over some distance. Stair-like terrain may resemble stairs in terms of a change in elevation (e.g., an inclined pitch with a gain in elevation or a declined pitch with a loss in elevation). However, with stair-like terrain the delineation of treads 22 and risers 24 is not as obvious. Rather, stair-like terrain may refer to terrain with tread-like portions that allow a robot to have enough traction to plant a stance limb and sequentially or simultaneously use a leading limb to ascend or to descend over an adjacent vertical obstruction (resembling a riser) within the terrain. For example, stair-like terrain my include rubble, an inclined rock scramble, damaged or deteriorating traditional stairs, etc.

The robot 100 includes a body 102 with locomotion based structures such as legs 104a-d coupled to the body 102 (e.g., at a stance angle Φ as shown in FIG. 1A) that enable the robot 100 to move about the environment 10. Although FIG. 1A depicts a quadruped robot with four legs 104a-d, the robot 100 may include any number of legs or locomotive based structures (e.g., a biped or humanoid robot with two legs) that provide a means to traverse the terrain within the environment 10. In order to traverse the terrain, each leg 104 has a distal end 106 that contacts a surface of the terrain. In other words, the distal end 106 of the leg 104 is the end of the leg 104 used by the robot 100 to pivot, plant, or generally provide traction during movement of the robot 100. For example, the distal end 106 of a leg 104 corresponds to a foot of the robot 100.

Figure 1B:
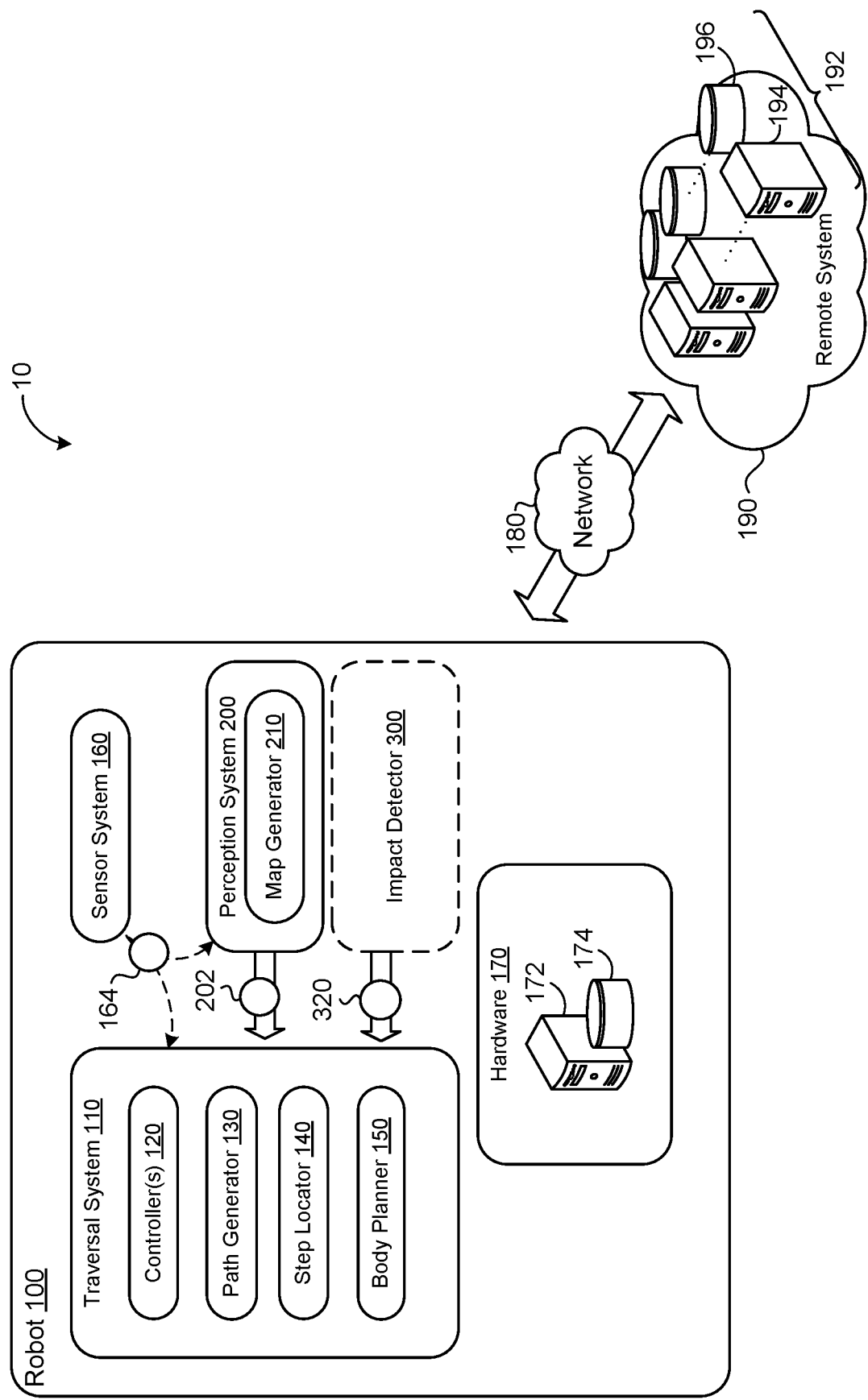
FIG. 1B is a schematic view of an example arrangement of systems of the robot of FIG. 1A.

In some implementations, as shown in FIG. 1B, the traversal system 110 includes at least one controller 120, a path generator 130, a step locator 140, and a body planner 150. The traversal system 110 is configured to communicate with at least one sensor system 160 and a perception system 200. The traversal system 110 performs operations and other functions using hardware 170, such as data processing hardware 172 and/or memory hardware 174, of the robot 100. In some examples, the hardware 170 is central to the robot 100 such that various system of the robot 100 may share in use of the hardware 170 (e.g., the traversal system 110, the sensor system 160, the perception system 200, and/or the impact detector 300). In some configurations, one or more systems (e.g., the traversal system 110, the controller 120, the sensor system 160, the perception system 200, and/or the impact detector 300, etc.) of the robot 100 have their own dedicated hardware (e.g., in communication with the hardware 170 of the robot 100). The controller 120 is configured to control movement of the robot 100 to traverse about the environment 10 based on input or feedback from the systems of the robot 100 (e.g., the traversal system 110, the perception system 200, the impact detector 300, etc.). This may include movement between poses and/or behaviors of the robot 100. For example, the controller 120 controls different footstep patterns, leg patterns, body movement patterns, or vision system sensing patterns. Here, the controller 120 is configured to communicate with the data processing hardware 172 and/or the memory hardware 172 of the robot 100 to execute movements provided from systems of the robot 100 (e.g., the traversal system 110, the perception system 200, the impact detector 300, etc.).

In some examples, the controller 120 includes a plurality of controllers 120 where each of the controllers 120 has a fixed cadence. A fixed cadence refers to a fixed timing for a step or swing phase of a leg 104. For example, the controller 120 instructs the robot 100 to move the legs 104 (e.g., take a step) at a particular frequency (e.g., step every 250 milliseconds, 350 milliseconds, etc.). With a plurality of controllers 120 where each controller 120 has a fixed cadence, the robot 100 can experience variable timing by switching between controllers 120. In some implementations, the robot 100 continuously switches/selects fixed cadence controllers 120 (e.g., re-selects a controller 120 every 3 milliseconds) as the robot 100 traverses the environment 10.

The traversal system 110 may select a controller 120 based on a step plan for the controller 120. The traversal system 110 may generate a step plan for each controller 120 based on a cadence (i.e., movement pace programmed for a given controller) and at least one steering command to move the robot 100 about the environment 10. A step plan refers to a map of unconstrained foot placements (referred to as an unconstrained map) corresponding to where the robot 100 would step (i.e., a placement location for the distal ends 106 of the legs 104) if there were no collision regions 220 present in the terrain about the environment 10 based on the cadence of a controller 120. Given the step plan, the traversal system 110 compares the step plan to a constrained map 202 generated by the perception system 200. Based on the comparison, the traversal system 110 selects the controller 120 whose step plan violates the least amount of constraints identified within the constrained map 202 (i.e., the step plan that requires the least amount of deviation to achieve the constrained map 202). By selecting a controller 120 with the least deviation, the traversal system 110 may ensure that the robot 100 requires the least adjustment to avoid collision regions 220 (or target step regions 220).

In some implementations, the traversal system 110 scores each controller 120 based on a relation between the step plan and the constrained map 202 and selects the controller 120 with an optimal score. For instance, the traversal system 110 selects a controller 120 with a lowest score corresponding to a controller 120 with the step plan having the least deviation to achieve the constrained map 202. In some examples, the score corresponds to a cost function based on soft constraints or conditions for a controller 120 in addition to the relation between the step plan and the constrained map 202. The traversal system 110 may also be configured with conditions that rule out a particular controller 120 prior to scoring and/or selection. Some examples of conditions include whether a desired contact with the terrain is achievable based on a location of the swing feet or whether particular step heights are required during traversal. In some configurations, the cost function applies weights to different conditions where the deviation between the step plan and the constrained map is the condition of greatest importance.

In some examples, the memory hardware 174 stores movements or movement constraints for the traversal system 110 locally on the robot 100. In other examples, these movements or constraints are stored and/or accessed remotely by the traversal system 110. For example, the traversal system 110 communicates via a network 180 with a remote system 190. The remote system 190 may be a server or cloud-based environment that includes remote resources 192 such as remote data processing hardware 194 and remote memory hardware 196. In some implementations, movements or traversal constraints are stored and/or processed on the remote system 190 using remote resources 192 and are communicated to the traversal system 110 and/or controller 120 of the robot 100 via the network 180. In yet other examples, different outputs related to the traversal system 110 are processed and/or stored remotely (e.g., via the remote system 190) and locally (e.g., via the memory hardware 174).

The sensor system 160 includes one or more sensors 162, 162a-n. The sensors 162 may include vision/image sensors, inertial sensors (e.g., an inertial measurement unit (IMU)), force sensors, and/or kinematic sensors. Some examples of sensors 162 include a camera such as a stereo camera, a scanning light-detection and ranging (LIDAR) sensor, or a scanning laser-detection and ranging (LADAR) sensor. In some examples, the sensor 162 has a corresponding field(s) of view $F_V$ defining a sensing range or region corresponding to the sensor 162. For instance, FIG. 1A depicts a field of a view $F_V$ for the robot 100. Each sensor 162 may be pivotable and/or rotatable such that the sensor 162 may, for example, change the field of view $F_V$ about one or more axis (e.g., an x-axis, a y-axis, or a z-axis in relation to a ground plane G).

When surveying a field of view $F_V$ with a sensor 162, the sensor system 160 generates sensor data 164 (also referred to as image data) corresponding to the field of view $F_V$. In some examples, the sensor data 164 is image data that corresponds to a three-dimensional volumetric point cloud generated by a three-dimensional volumetric image sensor 162. Additionally or alternatively, when the robot 100 is maneuvering about the environment 10, the sensor system 160 gathers pose data for the robot 100 that includes inertial measurement data (e.g., measured by an IMU). In some examples, the pose data includes kinematic data and/or orientation data about the robot 100. With the sensor data 164, the perception system 200 may generate a map 212 (or an constrained map 202) for the terrain about the environment 10.

Sensor data 164 gathered by the sensor system 160, such as the image data, pose data, inertial data, kinematic data, etc., relating to the environment 10 may be communicated to the traversal system 110 (e.g., the data processing hardware 172 and memory hardware 172) of the robot 100. In some examples, the sensor system 160 gathers and stores the sensor data 164 (e.g., in the memory hardware 174 or memory hardware 196 of remote resources 192). In other examples, the sensor system 160 gathers the sensor data 164 in real-time and processes the sensor data 164 without storing raw (i.e., unprocessed) sensor data 164. In yet other examples, the traversal system 110 and/or remote resources 162 store both the processed sensor data 164 and raw sensor data 164.

Figure 1C:
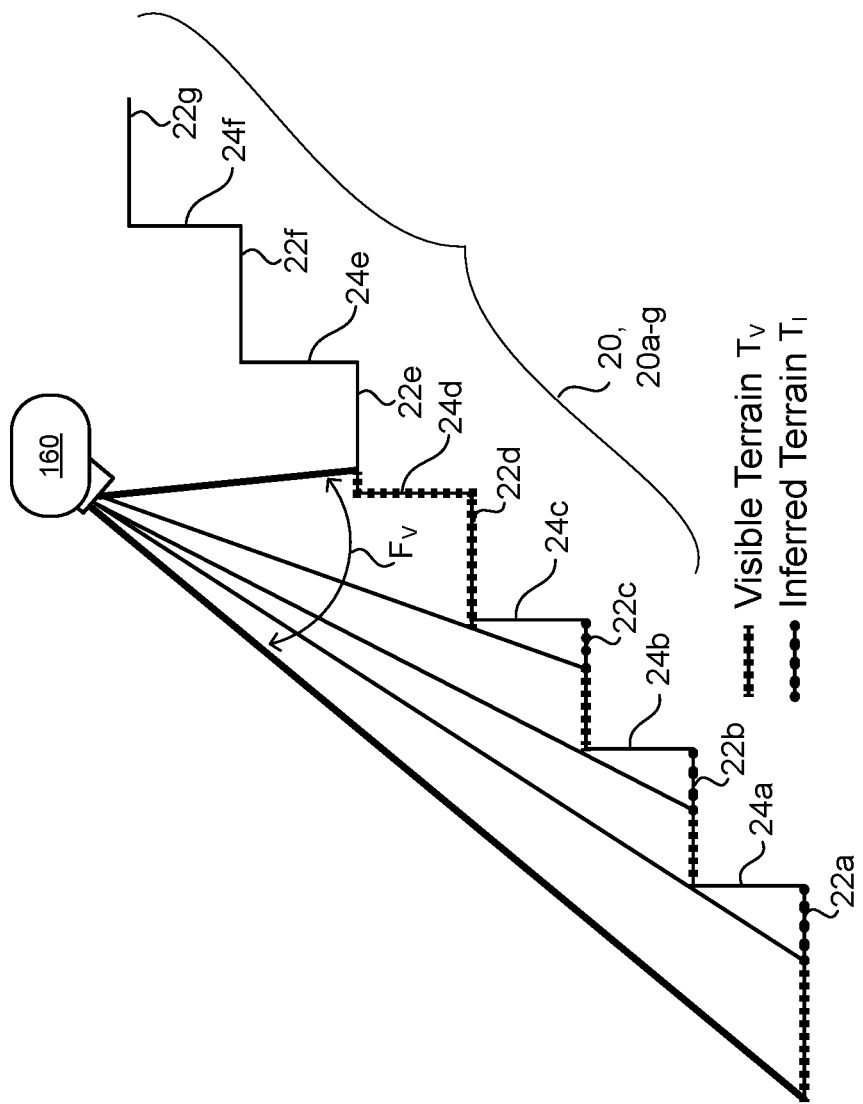
FIG. 1C is a schematic view of an example sensor system of the robot within the robotic environment of FIG. 1A.

As the robot 100 maneuvers about the environment 10, the sensor system 160 gathers sensor data 164 relating to the terrain of the environment 10. For instance, FIG. 1A depicts the sensor system 160 gathering sensor data 164 about stairs 20 as the robot 100 stands atop a landing of the stairs 20. As shown in FIG. 1C, the structure of the stairs 20 may lead to occlusions of sensor data 164 (i.e., incomplete sensor data 164). For example, when looking up or down the stairs 20, the sensor system 160 is not capable of visualizing an entirety of the stairs 20 in detail. In the case of traditional stairs 20, this is often because a riser 24, before or after a tread 22, visually obstructs portions of the tread 22 of a stair 20. With these obstructions, the sensor system 160 is unable to gather actual sensor data 164 for obstructed areas. This in turn leads to gaps in the sensor data 164 for the obstructed areas.

Referring to FIG. 1B, the path generator 130 is configured to determine horizontal motion for the robot 100. For instance, the horizontal motion refers to translation and/or yaw of the robot 100. The path generator 130 determines obstacles within the environment 10 about the robot 100 based on the sensor data 164. The path generator 130 communicates the obstacles to the step planner 140 such that the step planner 140 may identify foot placements for legs 104 of the robot 100 (e.g., locations to place the distal ends 106 of the legs 104 of the robot 100). The step planner 140 generates the foot placements (i.e., locations where the robot 100 should step) using inputs from the perceptions system 200 (e.g., regions 220, 230).

In some examples, the perception system 200 includes a map generator 210 that generates maps 212 based on the sensor data 164 of the terrain about the environment 10. In some implementations, the map generator 210 generates an incomplete map 212 and is configured to fill in gaps of sensor data 164 based on the nature of the sensor data 164. In other words, the map generator 210 of the perception system 200 infers details about the obstructed terrain (also referred to as inferred terrain $T_I$) from the sensor data 164 collected for the visible terrain $T_V$. Based on the sensor data 164, the map generator 210 is programmed to assume the missing sensor data 164 corresponds to either smooth terrain or flat terrain. When the sensor data 164 indicates a near object adjacent to a far object, the map generator 210 assumes this near-far contrast occurs due to an occlusion for the sensor system 160 within the environment 10. When the map generator 210 assumes an occlusion occurs, the map generator 210 fills in gaps of the sensor data 164 by mapping these gaps as flat terrain. In contrast, when the sensor data 164 does not indicate a near-far contrast, the map generator 210 assumes the missing sensor data 164 is due to poor vision by the sensor system 160 and maps the missing sensor data 164 as smooth terrain. Generally speaking, occlusions caused by stairs 20 have sensor data 164 indicating a near-far contrast such that the map generator 210 maps the obstructed terrain of the stairs 20 as flat. Referring to FIG. 1C, the map generator 210 maps the obstructed details for the stairs 20a-g caused by riser 24a-c as flat portions of treads 22a-c (i.e., generates flat inferred terrain $T_1$ due to the occlusion).

Figure 2A:
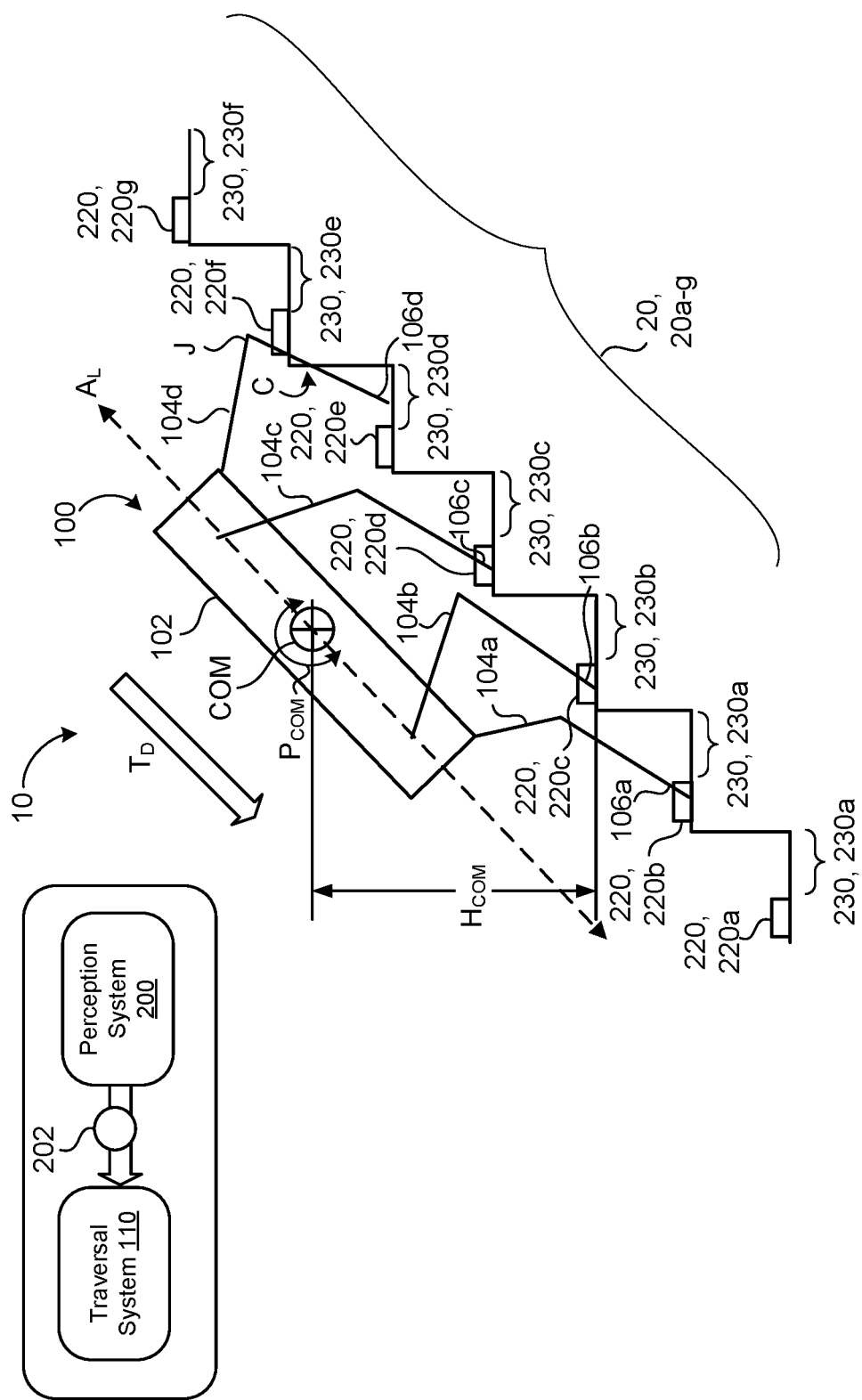
FIGS. 2A and 2B are schematic views of example body planners as the robot traverses terrain within the robotic environment.

Referring to FIG. 2A, based on a map 212 generated by the map generator 210 from the sensor data 164, the perception system 200 generates the constrained map 202 for the robot 100 (e.g., for the traversal system 110 of the robot 100 to execute). The perception system 200 generally communicates the constrained map 202 or portions of the constrained map 202 (e.g., collision/non-collision regions 220, 230) with the traversal system 110 (e.g., with the step locator 140 of the traversal system 110). The step locator 140 refers to a trajectory planner (also referred to as motion planning) for the robot 100 that is configured to plan trajectories of motion that avoid collisions while traversing the environment 10. With the map 212, the perception system 200 determines step regions 220 that identify a safe placement area on a stair 20 for the robot 100. The distal end 106 of a leg 104 may be placed within a step region 220 and reduce and/or eliminate a likelihood of interference between a portion of the leg 104 and the structure of the stairs 20. For example, FIG. 2A illustrates step regions 220, 220a-g for seven stairs 20a-g. Outside of the step region 220, a portion of the leg 104 of the robot 100 risks collisions C with the structure of the stairs 20. In some implementations, when the robot 100 steps too close to a riser 24, the robot 100 risks striking a portion of the leg 104 on a portion of the stairs 20 when ascending or descending the stairs 20 (e.g., the riser 24 or the nose 26 of the tread 22). For instance, FIG. 2A depicts the leg 104d of the robot 100 having a collision C at an area corresponding to its shin. Here, the collision C occurs against the riser 24 of the stair 20 as the robot 100 descends the stairs 20 and bends a joint J of a rear leg 104d of the robot 100.

In some examples, outside of the step region 220 is too close to an edge of a stair 20 such that placement of a distal end 106 of the leg 104 in this area will cause the leg 104 of the robot 100 to slip off the stair 20. By determining step regions 220 based on the sensor data 164, the perception system 200 helps the robot 100 to successfully traverse the stairs 20 or stair-like terrain (e.g., with minimal issues or no collisions). Collusions C by the robot 100 are generally an issue because collisions C may prevent the robot 100 from traversing the stairs 20 or stair-like terrain, cause timing issues when the robot 100 is performing a task or traveling to a destination, damage the stairs 20, and/or damage the robot 100 during travel (e.g., the robot 100 falls off the stairs 20).

In some implementations, the perception system 200 determines at least one collision region 230 (e.g., collision regions 230, 230a-f) for each stair 20. The collision region 230 refers to a region of a stair 20 that a leg 104 of the robot 100 should avoid when the robot 100 traverses the stairs 20, 20a-n. In other words, in the collision region 220, a portion of the leg 104 of the robot 100 is likely or inevitably going to have a collision C with the structure of the stairs 20. In some examples, the perception system 200 determines collision regions 230 (i.e., no-step regions) instead of step regions 220 and the robot 100 receives instructions to avoid the collision regions 230 to traverse the stairs 20. In other examples, the perception system 200 determines both step regions 220 and collision regions 230 (i.e., regions 220, 230).

In some configurations, the perception system 200 determines step regions 220 and/or collision regions 230 prior to traversing the stairs 20. Additionally or alternatively, the perception system 200 may determine step regions 220 and/or collision regions 230 while traversing the stairs 20 (e.g., continuously in real-time). For instance, the perception system 200 continuously determines step regions 220 and/or collision regions 230 as the robot 100 encounters and traverses the stairs 20. Whether the perception system 200 determines the steps regions 220 and/or collision regions 230 prior to or during travel may depend on design capabilities and/or processing capabilities for the sensor system 160 and/or other systems (e.g., the traversal system 110) of the robot 100.

In some examples, the perception system 200 accounts for a pose and/or an attitude of the robot 100 prior to traversing the stairs 20. For example, the robot 100 may ascend or descend the stairs 20 forward (i.e., front sensors of the sensor system 160 face or sense a traversal direction $T_D$) or backwards (i.e., the front sensors of the sensor system 160 face opposite the traversal direction $T_D$). Here, the perception system 200 recognizes whether the robot 100 is traversing the stairs 20 forward or backwards in order to determine the step regions 220 and/or collision regions 230. When descending the stairs 20 going forward, there may be a narrow step region 220 near the edge of each stair 20 due to the structure of the legs 104 of the robot 100 (e.g., the flexion of the joints J of the legs 104). As a contrasting example between going forward and backwards, when the robot 100 traverses the stairs 20 going backwards, the perception system 200 determines, based on the structure of the legs 104 of the robot 100, that the step regions 220 corresponding to a middle 50-70% of the tread 22. In other words, as the perception system 200 recognizes the robot's orientation (e.g., pose and/or attitude), the step regions 220 and/or collision regions 230 may vary to account for the orientation and limitations of the robot 100 related to the structure of the stairs 20 in the determined orientation.

The perception system 200 may determine the step regions 220 and/or collision regions 230 (also referred to as regions 220, 230) based on the terrain map 212 from the sensor data 164 and/or kinematics of the robot 100. In some examples, the perception system 200 determines that discontinuities in height within the map 212 correspond to areas where the ground is steep (e.g., a riser 24 or an edge of the tread 22). These areas may be designated as collision regions 230. The perception system 200 may also use kinematics to determine the regions 220, 230. For example, the perception system 200 factors in a speed of travel of the robot 100 (e.g., velocity of a center of mass of the robot 100) and/or a traversal direction $T_D$ (i.e., a direction of travel) for the robot 100 to determine the regions 220, 230. Additionally or alternatively, the perception system 200 may designate areas of poor sensor data 164 as collision regions 230.

Figure 2B:
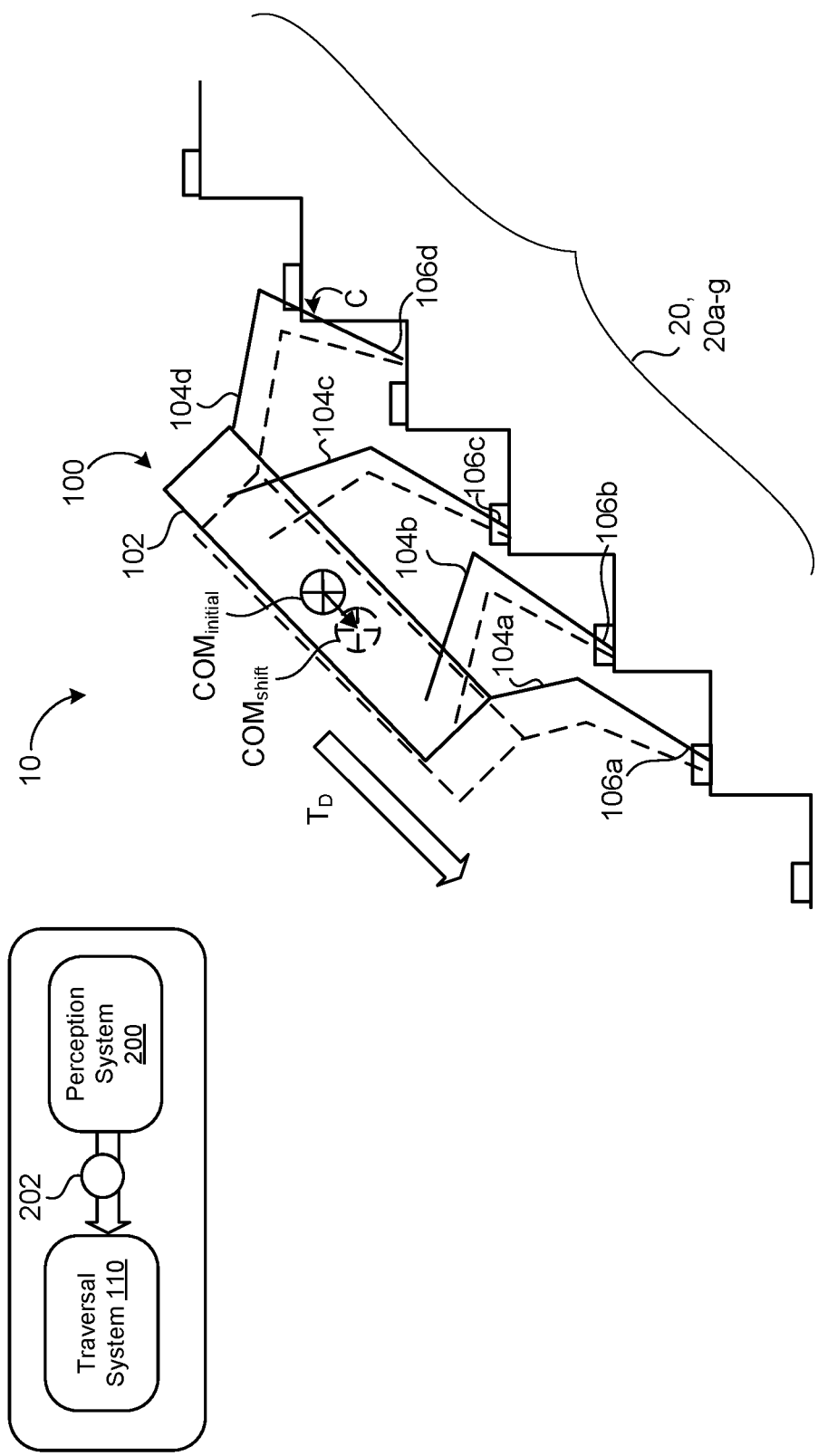

In some examples, prior to or while traversing the stairs 20, the robot 100 shifts a weight distribution of the robot 100 towards a front portion of the robot 100 (e.g., toward the front legs 104a-b). When the robot 100 is traversing the stairs 20, shifting a weight of the robot 100 forward relative to distal ends 106 of the legs 104 may reduce potential collisions C of the legs 104 with the stairs 20. For instance, FIG. 2A depicts the robot 100 descending the stairs 20a-g. Here, FIG. 2B illustrates that shifting a weight of the robot 100 forward allows lower legs (e.g., legs 104a-b) to become more vertical or upright and upper legs (e.g., hind legs 104c-d) to become more horizontal. In other words, kinematically, a center of mass COM of the robot 100 when shifted forward relative to the distal ends 106 (e.g., feet) of the legs 104 results in more weight on front legs 104a-b of the robot 100 than the hind legs 104c-d of the robot 100. In other words, the mass distribution of the robot 100 is towards the front of the robot 100 and the front legs 104a-b experience an increase in vertical force at their respective distal ends 106a-b. FIG. 2B illustrates that the center of mass COM has been shifted from an initial position $COM_{initial}$ to a shifted position $COM_{shift}$ toward the traversal direction $T_D$. With this shift, FIG. 2B shows, according to dotted lines, that one of the hind legs 104d would avoid a collision C with the stairs 20. In some examples, the controller 120 of the robot 100 functions in terms of center-of mass dynamics. Here, with this type of function, the body planner 150 instructs the controller 120 of the robot 100 to shift the center of mass COM forward relative to the distal ends 106 in order to traverse the stairs 20 as shown in FIG. 2B.

In some examples, the body planner 150 is configured to determine a height $H_{COM}$ and a pitch $P_{COM}$ for the robot 100 as part of the control of the robot 100 according to the traversal system 110. Here, the height $H_{COM}$ of the robot 100 corresponds to a distance between the center of mass COM of the robot 100 and the stairs 20 (e.g., the surface of the tread 22 below the center of mass COM as shown in FIG. 2A). The pitch $P_{COM}$ of the robot 100 generally refers to a rotation of the robot 100 with respect to a center of the body 102 along a longitudinal axis $A_L$ of the body 102 of the robot 100 (e.g., as shown in FIG. 2A). In other words, adjusting the pitch of the robot 100 moves a front of the body 102 (or a back of the body 102) of the robot 100 rotationally about the center of the body 102 of the robot 100 towards the stairs 20 or away from the stairs 20. When the robot 100 traverses the stairs 20, the body planner 150 and/or the controller 120 may adjust a height and a pitch of the robot 100 based on a corresponding collision region 230 identified for one or more stairs 20. The body planner 150 may determine the height $H_{COM}$ and the pitch $P_{COM}$ for the robot 100 based on inputs, such as the terrain map 212 (or constrained map 202) and footstep locations from the step planner 140 (e.g., regions 220, 230 identified for each stair 20), and a set of constraints 240. In some implementations, to determine the height $H_{COM}$ and the pitch $P_{COM}$ for the robot 100, the body planner 150 is a quadratic programming trajectory planner configured to determine an optimal trajectory for the robot 100 that satisfies the constraints 240 based on the inputs. For example, the body planner 150 is a receding horizon controller. In some configurations, the constraints 240 are related to physical conditions of the robot 100 and/or the stair terrain. For example, the body planner 150 receives constraints 240 such as height constraints. One such example of a height constraint is a constraint 240 that indicates that the robot 100 (e.g., a body of the robot 100) cannot be at a height that prevents the robot 100 from contacting a surface underneath the robot 100 (i.e., prevents a distal end 106 of the robot 100 from contacting the stairs 20). Another example of a height constraint received by the body planner 150 is a minimum height to prevent collisions C of the robot 100 (e.g., a leg 104 of the robot 100) with the stairs 20. In other words, the body 102 of the robot 100 cannot be so close (e.g., low) to the stairs 20 that collisions C occur between the stairs 20 and the robot 100. In either case, constraints 240 may be determined based on kinematics of the robot 100. For example, the body planner 150 may determine that one or more distal ends 106 of the legs 104 of the robot 100 contact a surface area of a respective stair 20 based on kinematics (e.g., kinematics corresponding to the legs 104). Similarly, when the body planner 150 determines the constraint 240 for the minimum height of the body 102 to prevent collisions C, the minimum height may be determined by kinematics of the robot 100.

To illustrate, when the robot 100 traverses the stairs 20, the body planner 150 may identify kinematics for each leg 104 of the robot 100. These kinematics for each leg 104 (e.g., flexion or extension of legs 104 with respect to joints J of the legs 104) allow the body planner 150 to determine a height of the body 102 with respect to each stair 20 that may be associated with a leg 104 (e.g., a corresponding stair 20 underneath each leg 104 or contacted by a distal end 106 of a leg 104). By identifying the kinematics of the legs 104, the body planner 150 may determine whether a height adjustment and/or a pitch adjustment for the body 102 would prevent one or more legs 104 from contacting the stairs 20 (i.e., satisfies a height constraint for the robot 100). For instance, when a height adjustment or pitch adjustment prevents a leg 104 from contacting the stairs 20, that leg 104 that cannot reach the stairs 20 may have an increased risk of collision C with the stairs 20 or an increased risk of causing imbalance to the robot 100. In some examples, in addition to determining whether the height adjustment or the pitch adjustment for the robot 100 satisfies a height constraint, the body planner 150 ensures that the legs 104 are still located in safe regions (e.g., locations of the distal ends 106 are located in step regions 220 rather than collision regions 230) when the body planner 150 adjusts the height $H_{COM}$ of the body 102 and/or the pitch $P_{COM}$ of the robot 100. In other words, the body planner 150 may adjust height $H_{COM}$ of the body 102 and/or a pitch $P_{COM}$ of the robot 100 based on regions 220, 230 (e.g., a step region 220 or a collision region 230) where legs 104 of the robot 100 are located and based on kinematics for each leg 104 of the robot 100.

Additionally or alternatively, the body planner 150 may receive cost(s) that correspond to an equality constraint that the body planner 150 attempts to satisfy, but may fail to satisfy at a tradeoff of other constraints. Here, for example, the body planner 150 receives a desired height of the hip of the body 102 with respect to one or more distal ends 106 of the legs 104 (e.g., with respect to the feet of the robot 100). Other constraints of the body planner 150 may include accelerations for the robot 100, such as a minimum or a maximum acceleration. In some implementations, the body planner 150 plans a trajectory that satisfies design constraints or structural constraints of the robot 100. For instance, the body planner 150 plans a trajectory that accounts for a strength of the robot 100 or an operating speed of the robot 100. In some examples, the body planner 150 plans a trajectory that is consistent with the velocity, the position of center of mass COM, and/or acceleration parameters of the robot 100. Once the body planner 150 determines the trajectory, the body planner 150 may communicate the trajectory to the controller 120 for execution. In some configurations, the body planner 150 is constantly communicating trajectories and/or updating trajectories for the controller 120 as the robot 100 traverses through the environment 10.

Referring to FIGS. 3A-3I, the robot 100 also may include an impact detector 300. The impact detector 300 is configured to detect an impact 310 (e.g., a collision C) of the robot 100 with the environment 10 (e.g., a collision C with the stairs 20) or with the robot 100 itself (e.g., a collision C between the front leg 104a and the hind leg 104c). Based on the impact 310, the impact detector 300 may generate a response 320 for the traversal system 110 (e.g., the controller 120) and/or body planner 150. In some implementations, the impact detector 300 detects the impact 310 and communicates the response 320 to the impact by traversal system 110 (e.g., the controller 120) of the robot 100. In some examples, the response 320 instructs the robot 100 to react to the impact 310 with a particular movement. In other examples, the response 320 instructs the robot 100 to proceed traversing the environment 10 with no particular movement reaction (e.g., continue with motion). The difference between these responses 320 depends on the type of impact 310 that the impact detector 300 detects.

To sense for impacts 310, the impact detector 300 may utilize the sensor system 160 of the robot 100. The impact detector 300 may use any combination of sensors 162 of the sensor system 160 to detect an impact 310, such as proximity sensors, vision/image sensors, inertial sensors, force sensors, kinematic sensors, etc. In some examples, the impact detector 300 uses sensor data 164 along with kinematics of the robot 100 to determine whether an impact 310 occurs during motion of the robot 100.

Figure 3A:
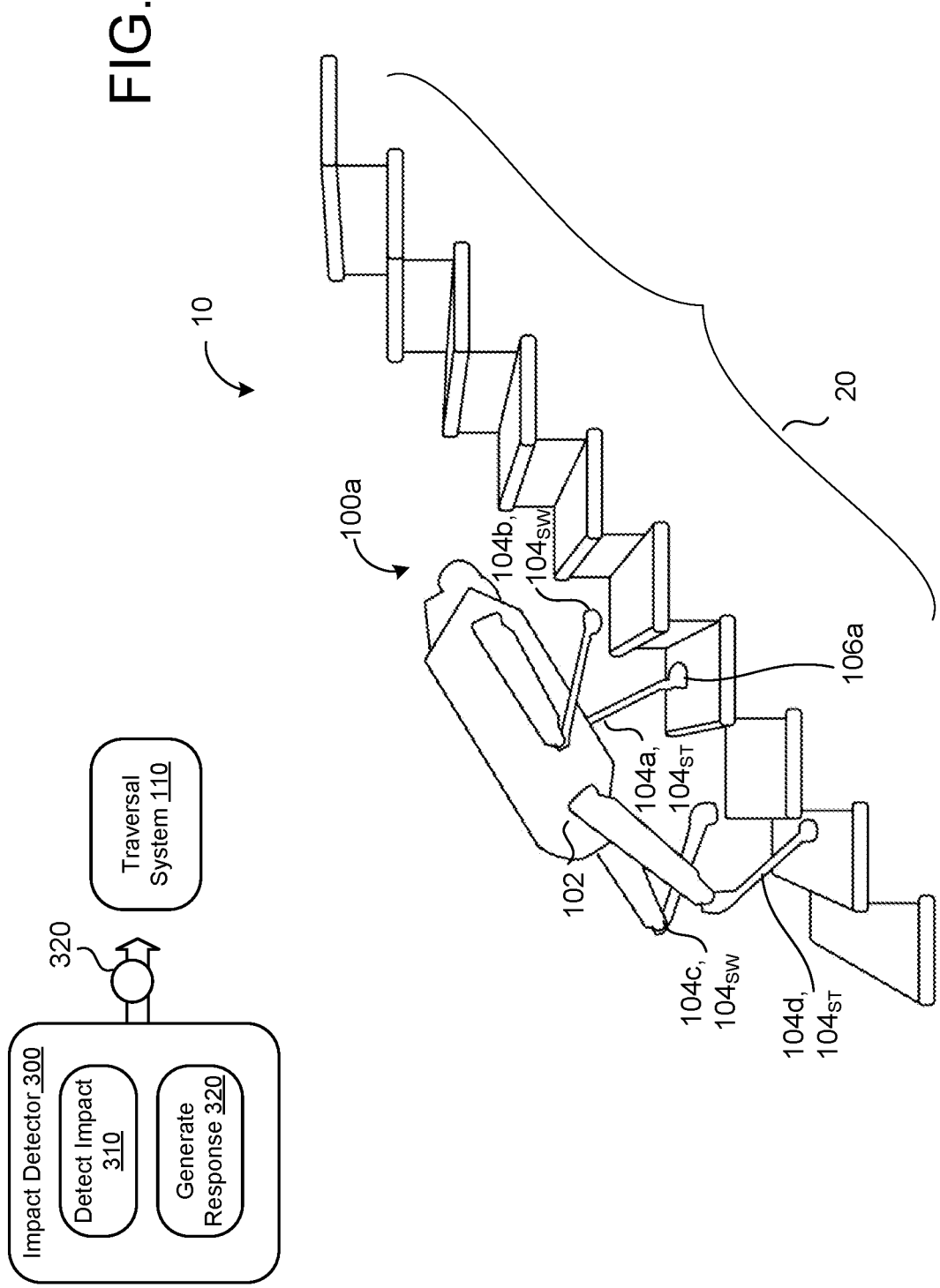

While the robot 100 moves a distal end 106 of a leg 104 to a target step location within a step region 220 (i.e., also outside a collision region 230), the impact detector 300 is configured to sense for impacts 310. In some examples, the impact detector 300 detects that a distal end 106 of the leg 104 contacts the corresponding target step location of a stair 20 (i.e., achieved touchdown in the target step location). For instance, the distal end 106 contacts a portion of the tread 22 (e.g., in the step region 220) as the target step location of the stair 20. Based on this detected impact 310, the impact detector 300 generates a response 320 to classify the leg 104 in contact with the stair 20 at the corresponding target step location as a stance leg $104_{ST}$. In other words, the leg 104 that was moving towards the target step location (i.e., the swing leg) becomes a stance leg $104_{ST}$ when a successful touchdown occurs. To illustrate, FIGS. 3A and 3B shows a sequence of the robot 100 traversing the stairs 20. In a first frame of the sequence, the robot 100 (shown as robot 100a in FIG. 3A) has a front leg 104a as a swing leg $104_{SW}$ and an opposite front leg 104b as a stance leg $104_{ST}$. When the swing leg 104a, $104_{SW}$ touches down and generates an impact 310 (as shown in the second frame with robot 100b in FIG. 3B), the impact detector 300 changes the classification of the original stance leg 104b, $104_{ST}$ to a swing leg 104b, $104_{SW}$.

A swing leg $104_{SW}$ refers to a leg 104 that is in motion (i.e., swinging) while not in contact with a surface of the environment 10. In contrast, a stance leg $104_{ST}$ refers to a leg 104 that is planted on (i.e., in contact with) a surface of the environment 10 to balance and to support the motion of the swing leg $104_{SW}$. When the robot 100 moves the swing leg $104_{SW}$, generally the controller 120 intends for the swing leg $104_{SW}$ to move along an unimpeded path of motion to a target step location, enabling the robot 100 to traverse the environment 10. Problems may occur if the swing leg $104_{SW}$ encounters an obstruction that impedes the motion of the swing leg $104_{SW}$ as an obstruction may cause a deviation in the planned motion that may, for example, cause the robot 100 to lose balance (i.e., trip and/or fall).

In some examples, the controller 120 changes the classification of the swing leg $104_{SW}$ and/or stance leg $104_{ST}$ prior to completion of a swing phase or a stance phase respectfully. By changing the classification of a leg 104 before completion of its phase, the controller 120 may compensate for delay or prevent command delays (or motion delays) to provide smooth motion of the robot 100. In other words, the controller 120 may attempt to synchronize the liftoff of the stance leg $104_{ST}$ and the touchdown of the swing leg $104_{SW}$. For instance, the controller 120 classifies the swing leg $104_{SW}$ as a stance leg $104_{ST}$ prior to touchdown. Similarly, the controller 120 may classify a current stance leg $104_{ST}$ to a swing leg $104_{SW}$ prior to any motion of that respective leg 104. In some examples, the controller 120 waits for both swing legs $104_{SW}$ of the robot 100 to touchdown before lifting off both of the previous stance legs $104_{ST}$ simultaneously. In these examples, this may occur to help the robot 100 maintain balance (e.g., when the robot 100 traverses the stairs 20 at a trot-like pace/cadence).

Figure 3C:
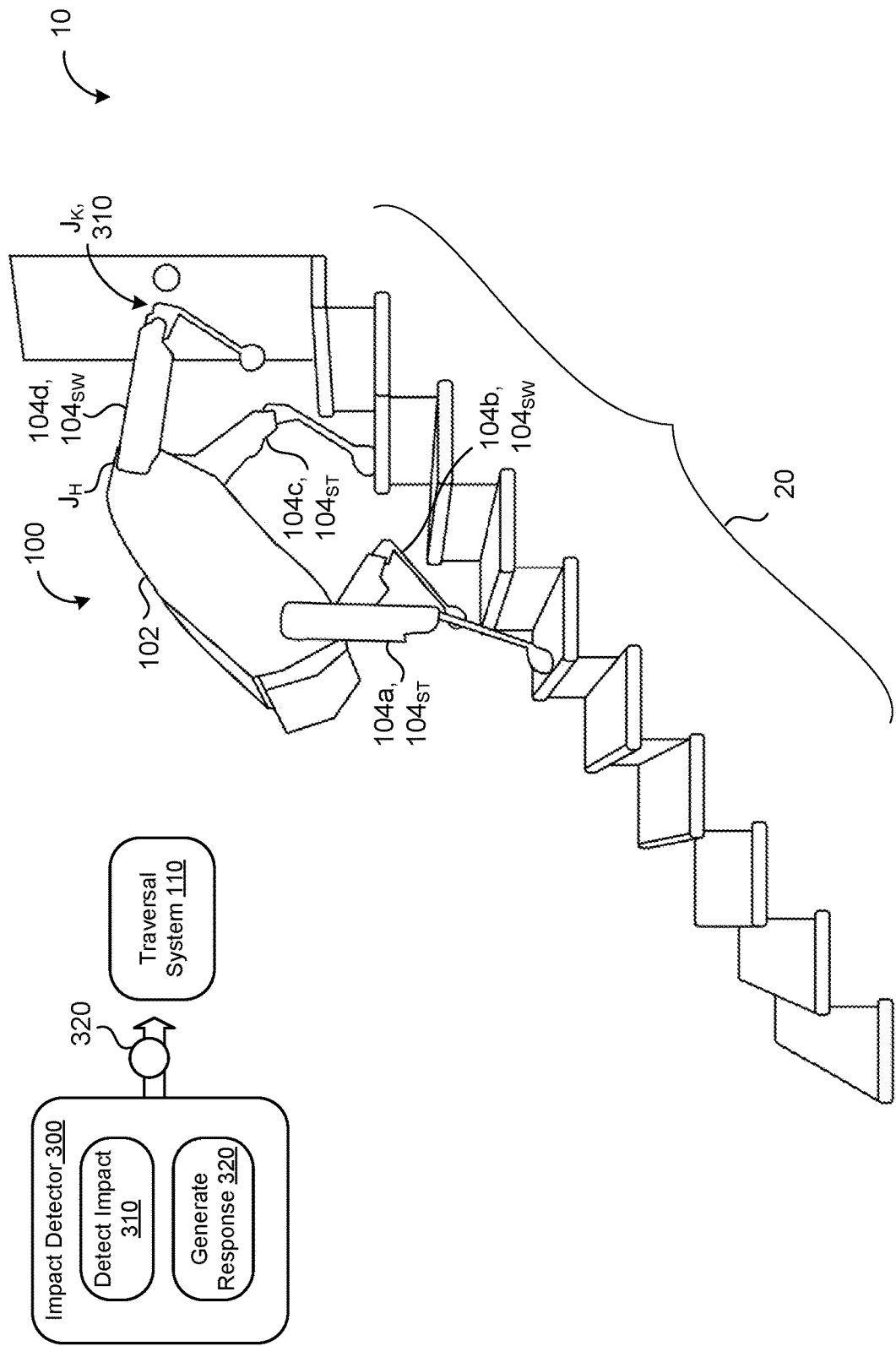

In some implementations, such as in FIG. 3C, when the robot 100 raises a leg 104 (e.g., shown as the hind leg 104d, $104_{SW}$) for movement during the swing phase, a knee joint $J_K$ of the leg 104 moves backward with respect to a hip joint $J_H$ (i.e., where a leg 104 couples to the body 102 of the robot 100). For instance, the swing phase includes an eccentric motion where the leg 104 is drawn or raised towards the body 102 of the robot 100 and a concentric motion where the leg 104 is extended towards touchdown (e.g., against a surface such as a tread 22 of a stair 20) away from the body 102 the robot 100. When the knee joint $J_K$ moves backwards (e.g., during the eccentric motion), the leg 104 may be at risk of having a collision C with an object behind the robot 100. In other words, as the knee joint $J_K$ moves backwards, the leg 104 (e.g., at the knee joint $J_K$) may have an impact 310 with an object behind the robot 100, such as a vertical object like a wall or a riser 24 of a stair 20. For example, the robot 100 is standing on a landing for the stairs 20 with a wall behind the robot 100 and a swing motion of a hind leg 104c-d impacts the wall. Here, the impact detector 300 detects the impact 310 with the terrain behind the robot 100 and generates a response 320 to move the knee (i.e., knee joint $J_K$) forward away from the terrain behind the robot 100. Otherwise, if the robot 100 continued to raise the leg 104, the knee joint $J_K$ may exhibit greater force on the object behind the robot 100. In the case of a wall as the object behind the robot 100, the continuance to raise the leg 104 may even embed the knee joint $J_K$ into the wall behind the robot 100 causing damage to the wall or the robot 100.

In some configurations, while the robot 100 is moving, a leg 104 of the robot 100 has an impact 310 with a contralateral leg $104_C$. For example, during the swing phase, a swing leg $104_{SW}$ strikes a contralateral stance leg $104_C$. A contralateral leg $104_C$ refers to a leg 104 on an opposite side of the body 102 of the robot 100 about a sagittal plane $P_S$ of the robot 100. The sagittal plane $P_S$ is an anatomical plane that divides a body 102 into right and left halves. With respect to a quadruped robot 100, the two front legs 104a-b are opposite each other (i.e., contralateral) about the sagittal plane $P_S$ of the robot 100 while, similarly, the hind two legs 104c-d are opposite each other (i.e., contralateral) about the sagittal plane $P_S$ of the robot 100. For a biped robot 100, the two legs 104 are always in a contralateral relationship.

Figure 3D:
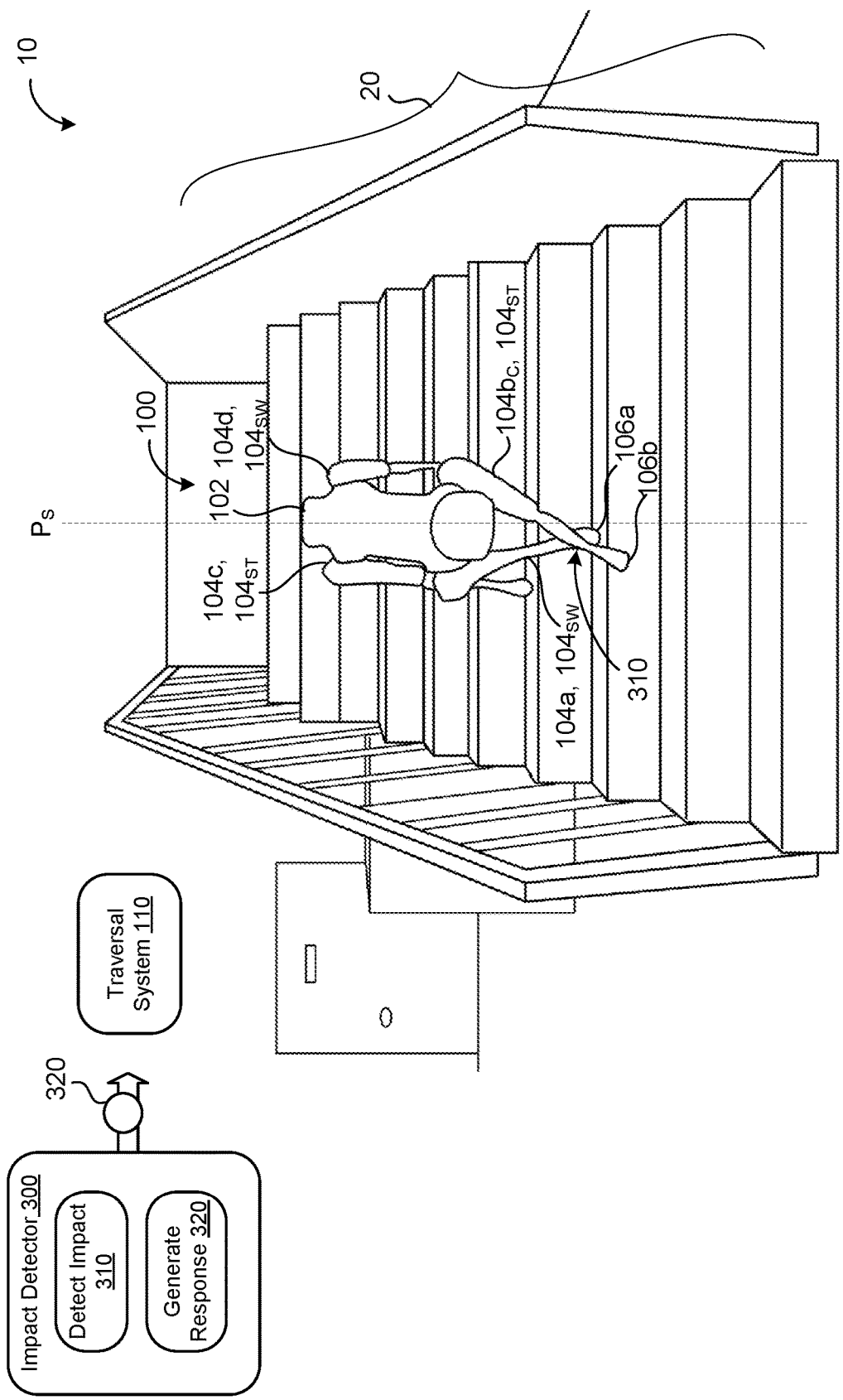
Figure 3E:
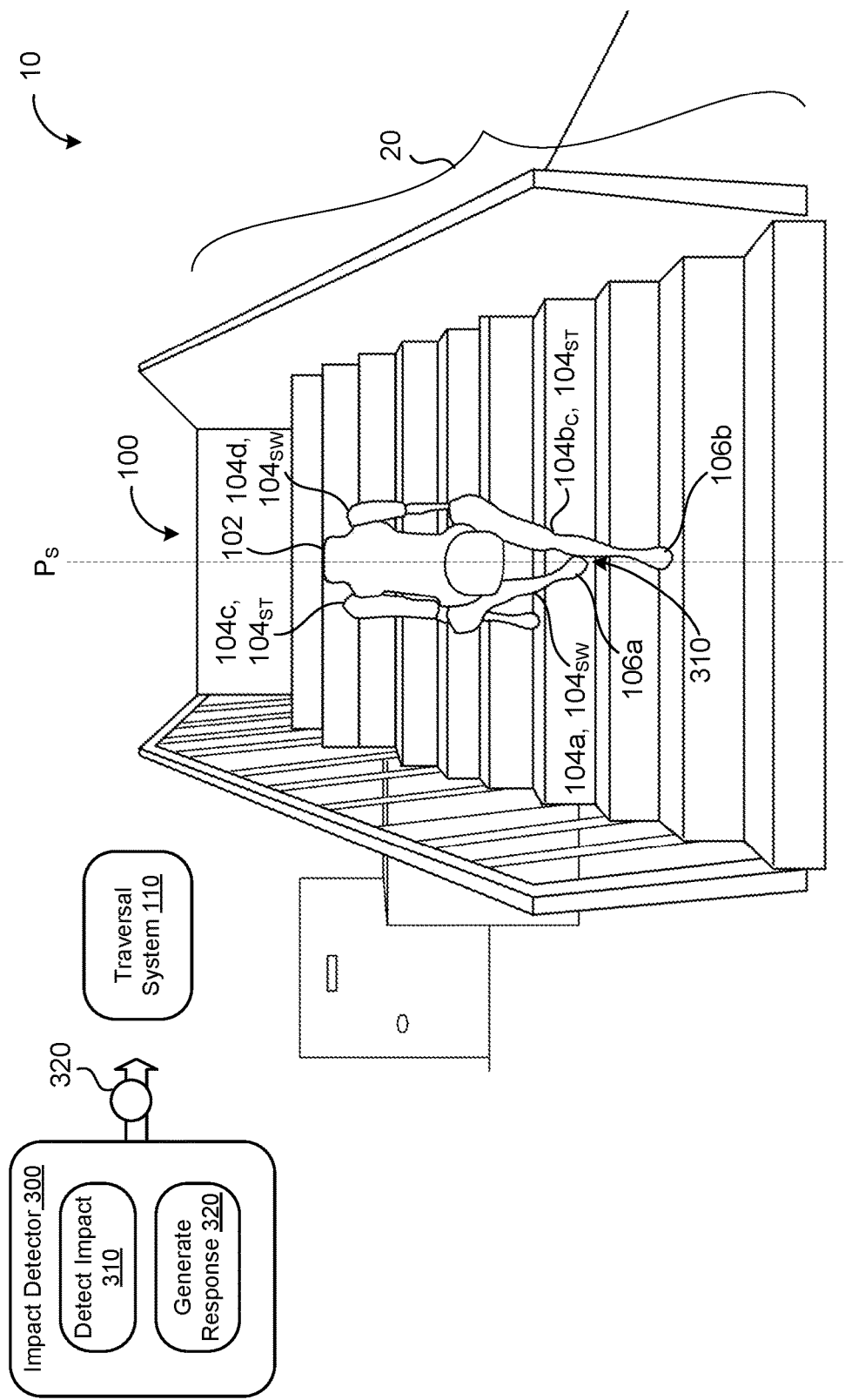

As shown in FIGS. 3D and 3E, when a leg 104 has an impact 310 with a contralateral leg $104_C$, the impact detector 300 detects this impact 310 and may vary its response 320 depending on the type of impact 310. In some examples, based on the detected impact 310, the impact detector 300 generates a response 320 to shift the swing leg $104_{SW}$ or distal end 106 of the swing leg $104_{SW}$ away from the contralateral stance leg $104_C$. In other words, instead of the swing leg $104_{SW}$ aiming for touchdown of the distal end 106 in a target step location, the response 320 shifts the swing leg $104_{SW}$ to an adjusted step location. Here, the adjusted step location is within a step region 220 (i.e., outside a collision region 220) of a stair 20, but shifted relative to the original target step location in order to counteract the impact 310 with the contralateral leg $104_C$. In some configurations, the adjusted step location is an entirely new target step location.

In some examples, due to the impact 310, a step location corresponding to the step region 220 or outside the collision region 230 may not be available as an adjusted step location for the response 320. In these situations, the impact detector 300 and/or perception system 200 may determine an adjusted step location that minimizes a likelihood of further impacts 310 with the terrain or the robot itself. For instance, the adjusted step location may be within the collision region 230, but within an area of the collision region 230 (e.g., near the edges of the collision region 230) that has a lower probability of collision C than other portions of the collision region 220. In some implementations, the perception system 200 may previously determine, or determine at the time of an impact 310, a collision probability distribution for a collision region 230 such that the impact detector 300 generates a response 320 with an adjusted step location that minimizes further impact based on the collision probability distribution. In some examples, with a probability distribution, an adjusted step location is selected based on a threshold corresponding to an acceptable probability or confidence level for a collision C. In other words, the threshold may represent that there are some areas (e.g., sub-regions) of the collision region 230 that may be acceptable for remedial situations while there are other areas of the collision region 230 that are too dangerous even for remedial situations. For instance, in some remedial situations, the impact 310 may have greater risk to the robot 100 than a distal end 106 of the leg 104 moving to adjusted step location within a less dangerous area of the collision region 230. More specifically, an area of the collision region 230 that is likely to cause a glancing impact may be acceptable for a remedial situation, while an area of the collision region 230 that causes the robot 100 to step off the stairs 20 completely is never acceptable. Additionally or alternatively, the perception system 200 may weight or classify areas of a collision region 230 by a risk to the robot 100 for a type of impact 310 likely to occur in a particular area. This may allow the robot 100 to account for areas of a collision region 230 with high risk, but low likelihood of impact 310.

In some implementations as depicted in FIG. 3D, when the impact 310 results in a leg 104 crossing its contralateral leg $104_C$ (e.g., shown as the front leg 104a crossing the other contralateral front leg $104b_C$), the impact detector 300 generates a response 320 to untangle the crossed legs 104. For example, the response 320 may instruct the swing leg $104_{SW}$ to reverse its path of motion to untangle the crossed legs 104 and to avoid further contact with the contralateral leg $104_C$. In some configurations, the response 320 is a two-part response such that the impact detector 300 first detects the impact 310 and instructs the swing leg $104_{SW}$ to move forward or backwards (e.g., depending on whether the swing leg $104_{SW}$ is crossed in front of the stance leg $104_{ST}$ or behind the stance leg $104_{ST}$) and then instructs the swing leg $104_{SW}$ to move laterally uncrossing the legs 104. If the response 320 instructed the swing leg $104_{SW}$ to take another path of motion (e.g., first moving the leg 104 laterally across the body 102 of the robot 100 to attempt to counteract the crossover), the swing leg $104_{SW}$ may trip the robot 100 or further collide with the contralateral stance leg $104_C$, $104_{ST}$. Moreover, if the response 320 did not generate an adjusted step location, the swing leg $104_{SW}$ may touchdown in a position that blocks the stance leg $104_{ST}$ from subsequent motion when the stance leg $104_{ST}$ becomes the swing leg $104_{SW}$.

In other implementations, as shown by FIG. 3E, when the impact 310 results in a leg 104 (e.g., the front swing leg 104a, $104_{SW}$) striking, but not crossing its contralateral leg $104_C$, the impact detector 300 generates a response 320 for the swing leg $104_{SW}$ to move away from the contralateral leg $104_C$. Here, the impact detector 300 determines that the impact 310 does not result in a crossover of the contralateral leg $104_C$ (e.g., the swing leg $104_{SW}$ striking the inside of the contralateral leg $104_C$). When the impact 310 with the contralateral leg $104_C$ (e.g., contralateral leg $104b_C$) does not result in a crossover, the impact detector 300 has more response options of where to move the swing leg $104_{SW}$ as the adjusted target location to counteract the impact 310. For example, here, moving the swing leg $104_{SW}$ laterally across the body 102 of the robot 100 will likely not result in further impact between the legs 104. In some configurations, the response 320 results in the swing leg $104_{SW}$ moving from a position at the contralateral leg $104_C$ to an adjusted target location region 220 on the swing leg's side of the sagittal plane $P_S$.

Figure 3F:
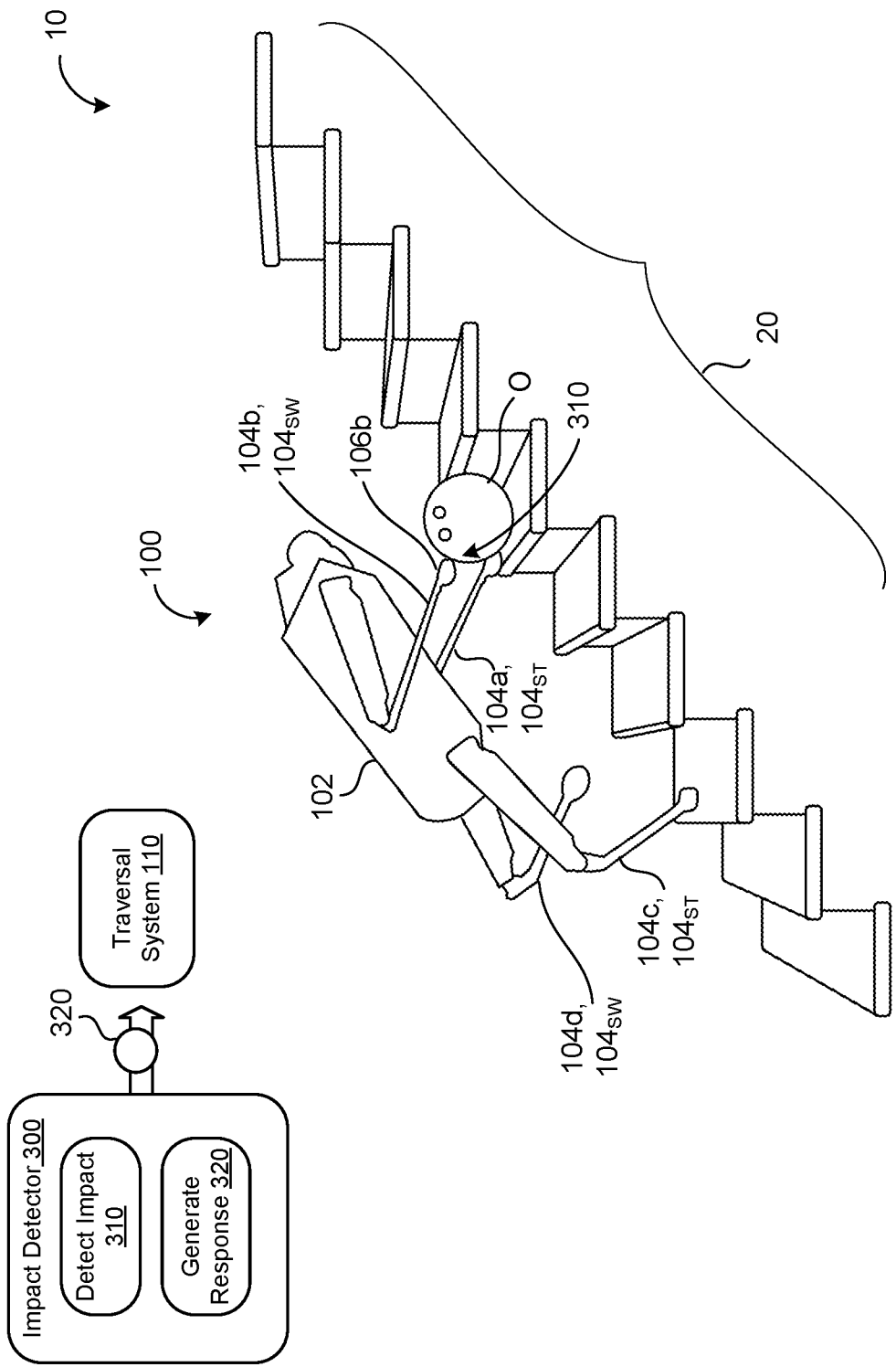

In some examples, FIG. 3F shows the swing leg $104_{SW}$ (e.g., shown as the front leg 104b) having an impact 310 with an object O that the swing leg $104_{SW}$ needs to swing up and over to continue its traversal path (i.e., an impact 310 that may trip the robot 100). In other words, the impact 310 indicates a trip condition that may cause instability for the robot 100. When the impact detector 300 detects this impact 310, the impact detector 300 may generate different responses 320 based a stage of the swing phase for the swing leg $104_{SW}$. When the impact detector 300 determines that the swing leg $104_{SW}$ is early in the swing phase (e.g., the swing leg is undergoing concentric motion towards the body 102 of the robot 100), the impact detector 300 generates a response 320 to further elevate the distal end 106 of the swing leg $104_{SW}$ (i.e., increase a height of the distal end 106 from an original liftoff surface or plane). When the impact detector 300 determines that the swing leg $104_{SW}$ is late in the swing phase (e.g., the swing leg $104_{SW}$ is undergoing eccentric motion towards a touchdown location), the impact detector 300 generates a response 320 to immediately touchdown the distal end 106 of the swing leg $104_{SW}$. These responses 320 minimize the likelihood that the robot 100 actually falls or becomes off balance from the impact 310 that indicates a trip condition.

In some examples, the impact detector 300 detects an impact 310, but does not generate a response 320 that results in an unplanned movement (i.e., a reaction movement based on the impact 310). In other words, even though at least one leg 104 of the robot 100 experiences an impact 310, the impact detector 300 either (a) does not generate a response 320 to this impact 310 or (b) generates a response 320 to proceed with the original path of movement. In some examples, after an impact 310, if the traversal system 110 (e.g., the controller 120) does not receive a response 320 in a threshold period of time, the traversal system 110 proceeds with movement as though the impact 310 did not occur. In other examples, after an impact 310, the traversal system 110 is configured to wait for a response 320 before proceeding with further motion such that the impact detector 300 generates a placeholder response 320 such as "no response" or a response 320 that explicitly instructs the robot 100 to proceed with the original path of movement.

Figure 3G:
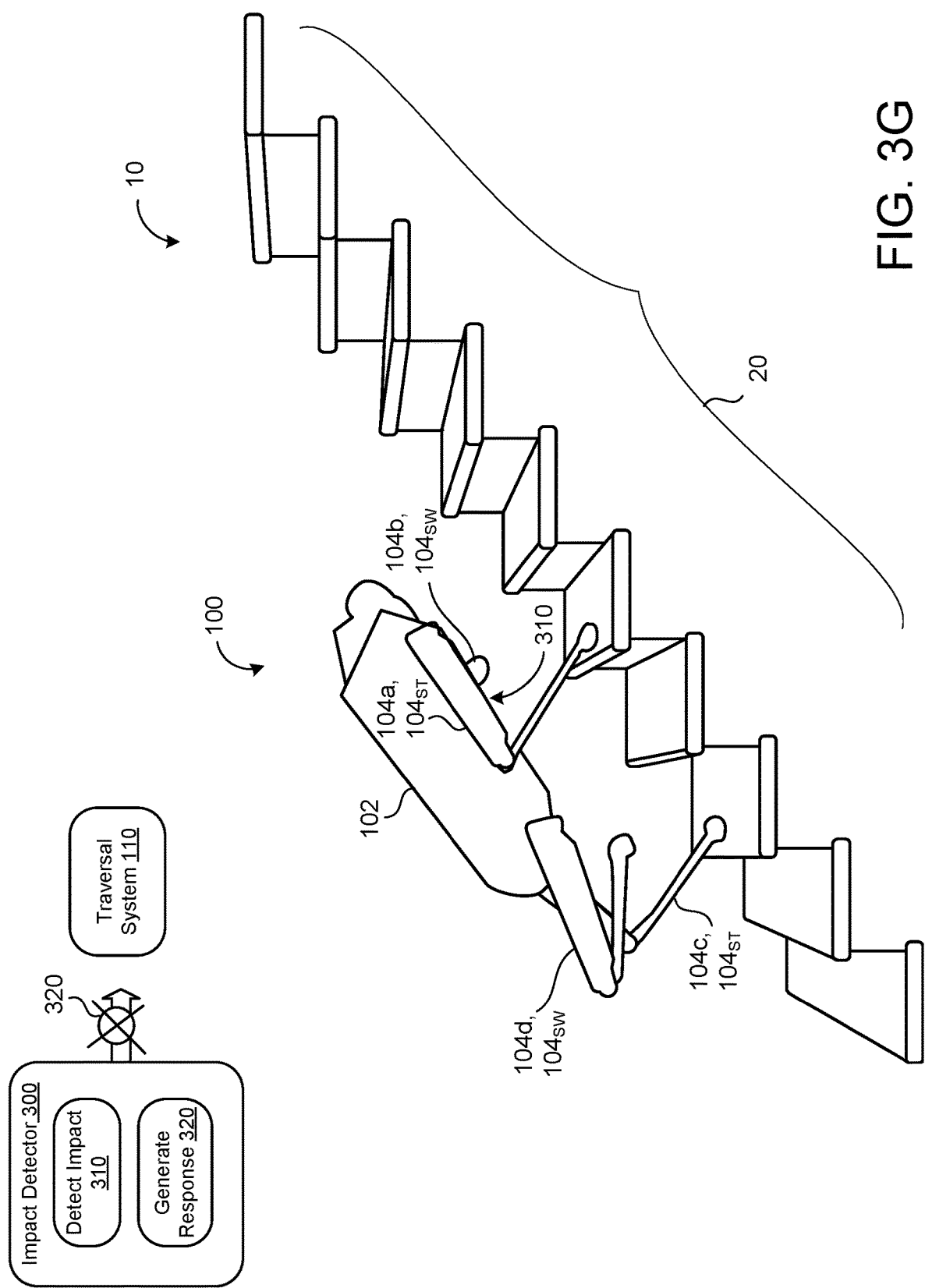

FIG. 3G is an example where the impact detector 300 detects an impact 310 of an upper portion of the leg 104

(e.g., corresponding to a thigh of the leg 104) against the body 102 of the robot 100. For example, FIG. 3G illustrates the front leg 104b generating an impact 310 against the body 102 of the robot 100. Here, even though there has been an impact 310 of the thigh against the body 102 of the robot 100, the impact 310 does not result in a response 320 causing a reaction movement based on the impact 310.

Figure 3H:
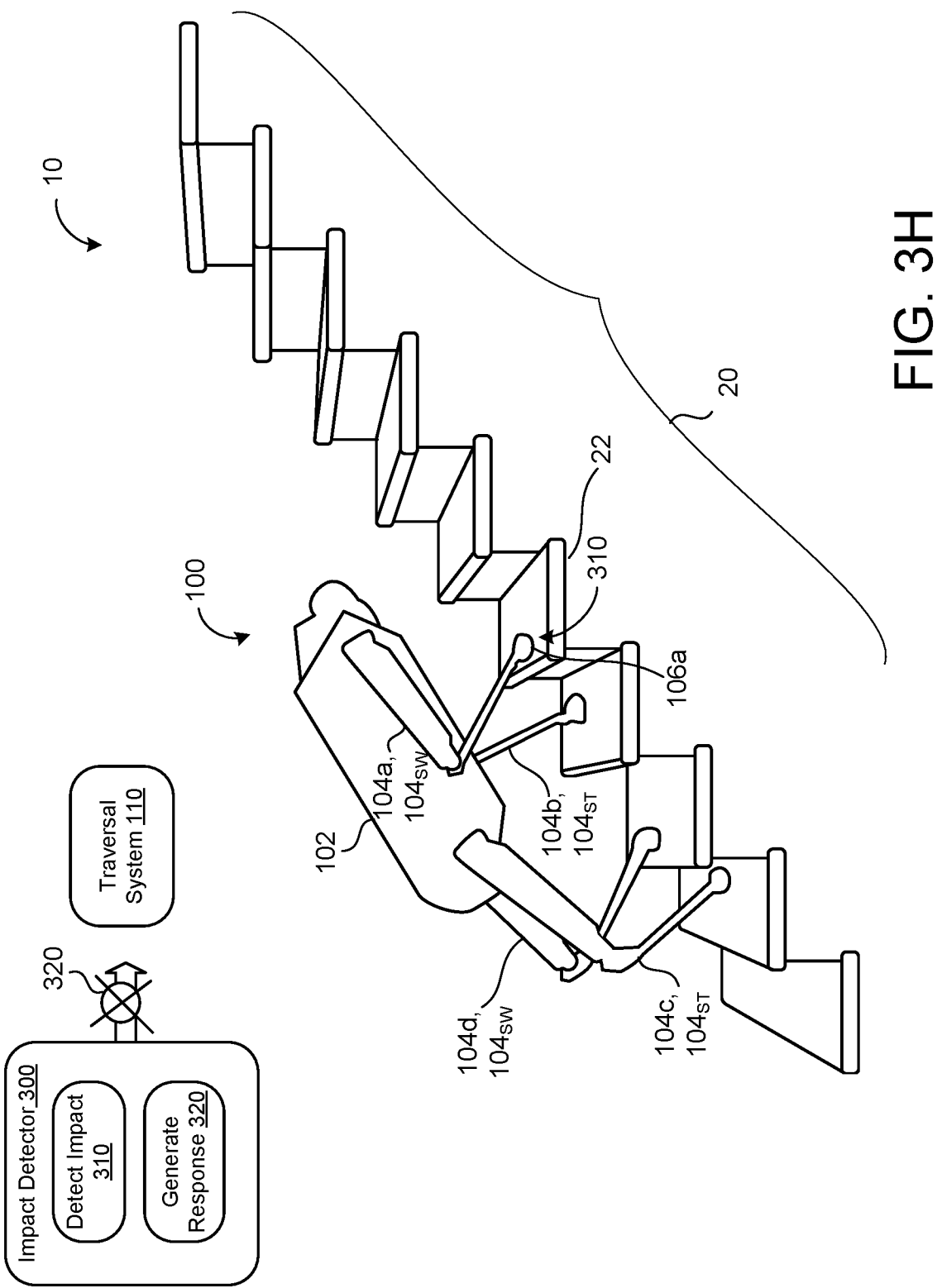

As another example, FIG. 3H shows that the impact detector 300 detects an impact 310 of the distal end 106 of a leg 104 (e.g., distal end 106a of the front leg 104a) as the leg 104 lifts off a surface (e.g., a tread 22 of a stair 20). For instance, as a leg 104 transitions from a stance leg $104_{ST}$ to a swing leg $104_{SW}$ early in the swing phase, the liftoff of the leg 104 (e.g., swing leg 104a, $104_{SW}$) generates an impact 310 (e.g., scuffing of the distal end 106a or foot of the robot 1004 against a surface). Liftoff scuffing may also occur on stair-like terrain when the distal end 106 of the stance leg $104_{ST}$ becomes at least partially embedded in the stair-like terrain such that when the stance leg $104_{ST}$ subsequently begins a swing phase, an upward motion that removes the respective leg 104 from the partial embedment causes an impact 310. When the impact detector 300 detects that the impact 310 corresponds to a liftoff scuffing for the distal end 106 of the leg 104, the impact detector 300 does not generate a response 320 of a reaction movement based on the impact 310. Here, the impact detector 300 may not generate a reaction movement because the swing leg $104_{SW}$, after liftoff scuffing, will continue to move upward and likely clear the obstruction causing the impact 310 naturally.

Figure 3I:
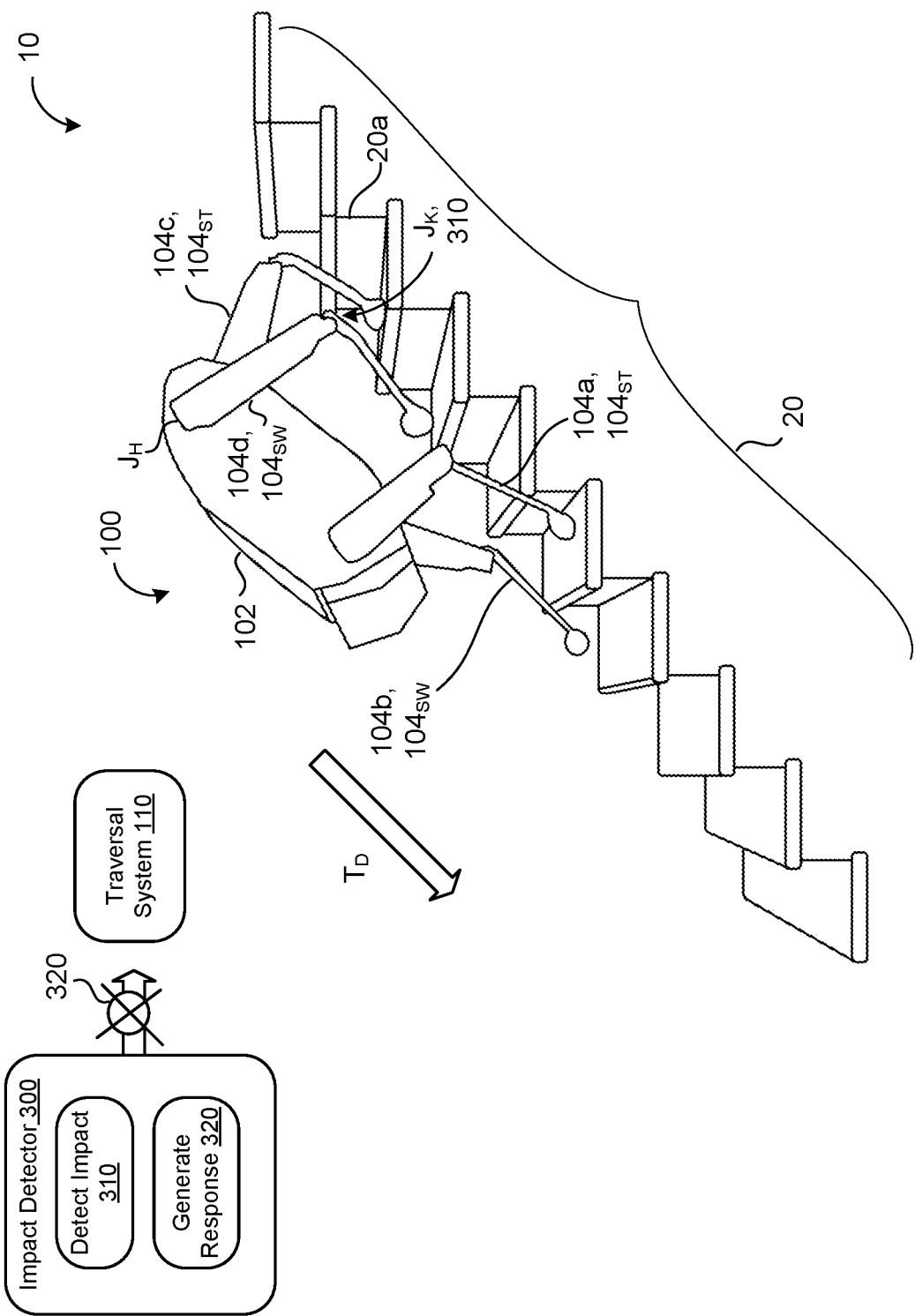

In yet another example, as shown in FIG. 3I, the impact detector 300 detects an impact 310 of a knee joint $J_K$ of a leg 104 (e.g., the hind leg 104d) of the robot 100 against terrain under the robot 100. Here, the impact detector 300 does not generate a response 320 of a reaction movement based on the impact 310 since this type of impact 310 is often a glancing impact. For instance, while the robot 100 is descending down stairs 20 and the body 102 of the robot 100 is too low, the swing leg $104_{SW}$ swings forward in the direction of travel $T_D$ and the knee joint $J_K$ clips the stair 20 (shown as the stair 20a) that the swing leg $104_{SW}$ intends to swing past. Because this is often a glancing impact 310 and the swing leg $104_{SW}$ will continue to swing following the glancing impact, a response 320 of a reaction movement is often not necessary for the robot 100 to successfully traverse the stairs 20. This may occur because of a combination of the height of the body 102 and the kinematics of the legs 104 of the robot 100. In other words, the leg 104 may be configured such that the knee joint $J_K$ sticks straight down during a position of the swing phase for a respective leg 104. With this knee joint $J_K$ position during the swing phase, the knee joint $J_K$ can clip a corner of a stair 20 (e.g., a corner of a tread 22 or a nose 26 of a stair 20).

Figure 3J:
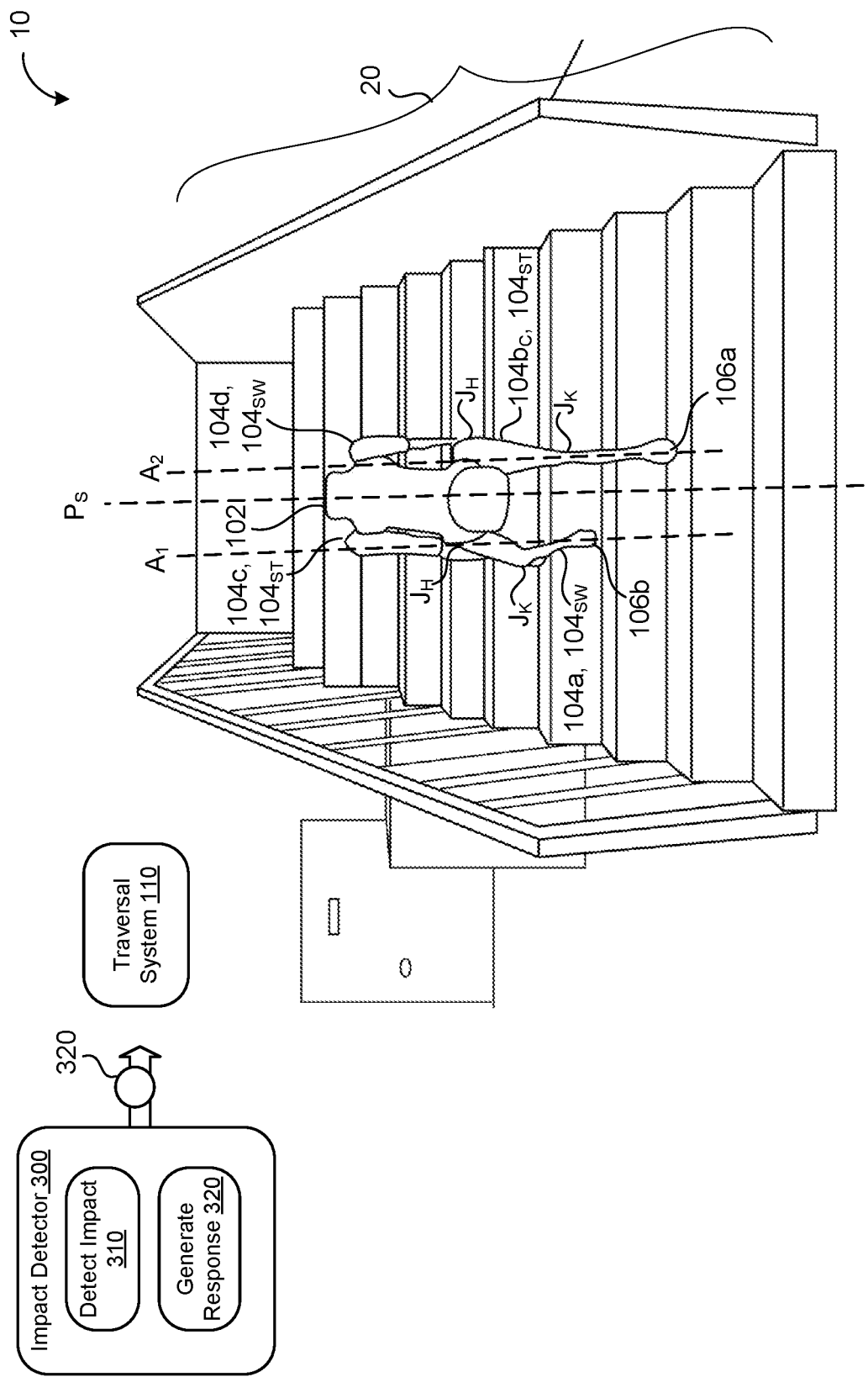

In some examples, to help the robot 100 traverse stairs 20 or stair-like terrain, the body planner 150 instructs the controller 120 to position a knee joint $J_K$ of a swing leg $104_{SW}$ away from the sagittal plane $P_S$ of the robot 100. For instance, FIG. 3J illustrates the knee joint $J_K$ positioned away from the sagittal plane $P_S$ of the robot 100 and away from a neutral position of the leg 104 (e.g., laterally outside a first axis $A_1$). In other words, often a neutral position for a leg 104 of the robot 100 occurs when the leg 104 of the robot 100 is generally perpendicular to the ground plane (e.g., surface of a tread 22 of a stair 20) such that a knee joint $J_K$ is generally aligned under the hip joint $J_H$ to attempt to evenly distribute any force experienced on the leg 104 at the distal end 106 and to minimize torque experienced by the joints $J_K$, $J_H$. Here, FIG. 3J depicts the front stance leg 104b, $104_{ST}$ as a neutral position as the hip joint $J_H$ and the knee joint $J_K$ align along a second axis $A_2$. By positioning the knee joint $J_K$ of the swing leg $104_{SW}$ away from the sagittal plane $P_S$ of the robot 100, a knee joint $J_K$ associated with a swing leg $104_{SW}$ may be less likely to cause a collision C resulting in a response 320 by the impact detector 300 and a potential deviation from a movement path to traverse the stairs 20 or stair-like terrain.

In some examples, as shown by FIG. 3K, the robot 100 while traversing the stairs 20 has a leading leg $104_L$ and a trailing leg $104_T$. In these examples, the robot 100 may crawl up or down the stairs 20 such that, in the case of a quadruped robot, one of the front legs 104a-b and one of the hind legs 104c-d substantially move in unison with one another. For instance, a front leg 104a-b moves at a similar time to a hind leg 104c-d on an opposite side of the body 102 of the robot 100 such that the robot 100 moves in a crawling manner to traverse the stairs 20. In some examples, the leading leg $104_L$ refers to a leg 104 that initially moves to ascend or descend the stairs 20, while the trailing leg $104_T$ refers to a leg 104 that follows the leading leg $104_L$ in timing when the robot 100 traverses the stairs 20. Since a front leg 104a-b and a hind leg 104c-d may move in unison, each set of legs 104 (e.g., the front set and the back set) has a leading leg $104_L$ and a trailing leg $104_T$. In some examples, the leading leg $104_L$ is determined by the initial swing leg $104_{SW}$ as the robot 100 traverses the stairs 20 while the trailing leg $104_T$ corresponds to the initial stance leg $104_{ST}$. In some configurations, when moving the distal end 106 of the leading leg $104_L$ (or swing leg $104_{SW}$) to a target step location of a stair 20, the robot 100 positions a distal end 106 of a trailing leg $104_T$ to a trailing step location that is located within a corresponding step region 220 of a trailing stair 20 located below (if ascending) or above (if descending) the stair 20 for the leading leg $104_L$. For instance, FIG. 3K depicts the leading leg 104a, $104_L$ at a first stair 20a and the trailing leg 104b, $104_T$ at a second stair 20b below the first stair 20a when the robot is ascending the stairs 20. In the example shown, the second stair 20b associated with the trailing stair 20 at which the trailing leg $104_T$ is positioned, is adjacent to the first stair 20a associated with the target step location for the leading leg $104_L$. However, in other examples, one or more intermediate stairs 20 may exist between the leading stair 20 associated with the target step location for the leading leg $104_L$ and the trailing stair 20 associated with the trailing step location for the trialing leg $104_T$. For instance, with reference to FIG. 1A, stairs 20 having treads 22 with shallower depths d and/or risers 24 having shorter heights h may permit the leading leg $104_L$ (or swing leg $104_{SW}$) to pass over one or more stairs when moving to a target step location such that one or more intermediate stairs 20 exist between the leading stair 20 associated with the target step location for the leading leg $104_L$ and the trailing stair 20 associated with the trailing step location for the trialing leg $104_T$.

Figure 4:
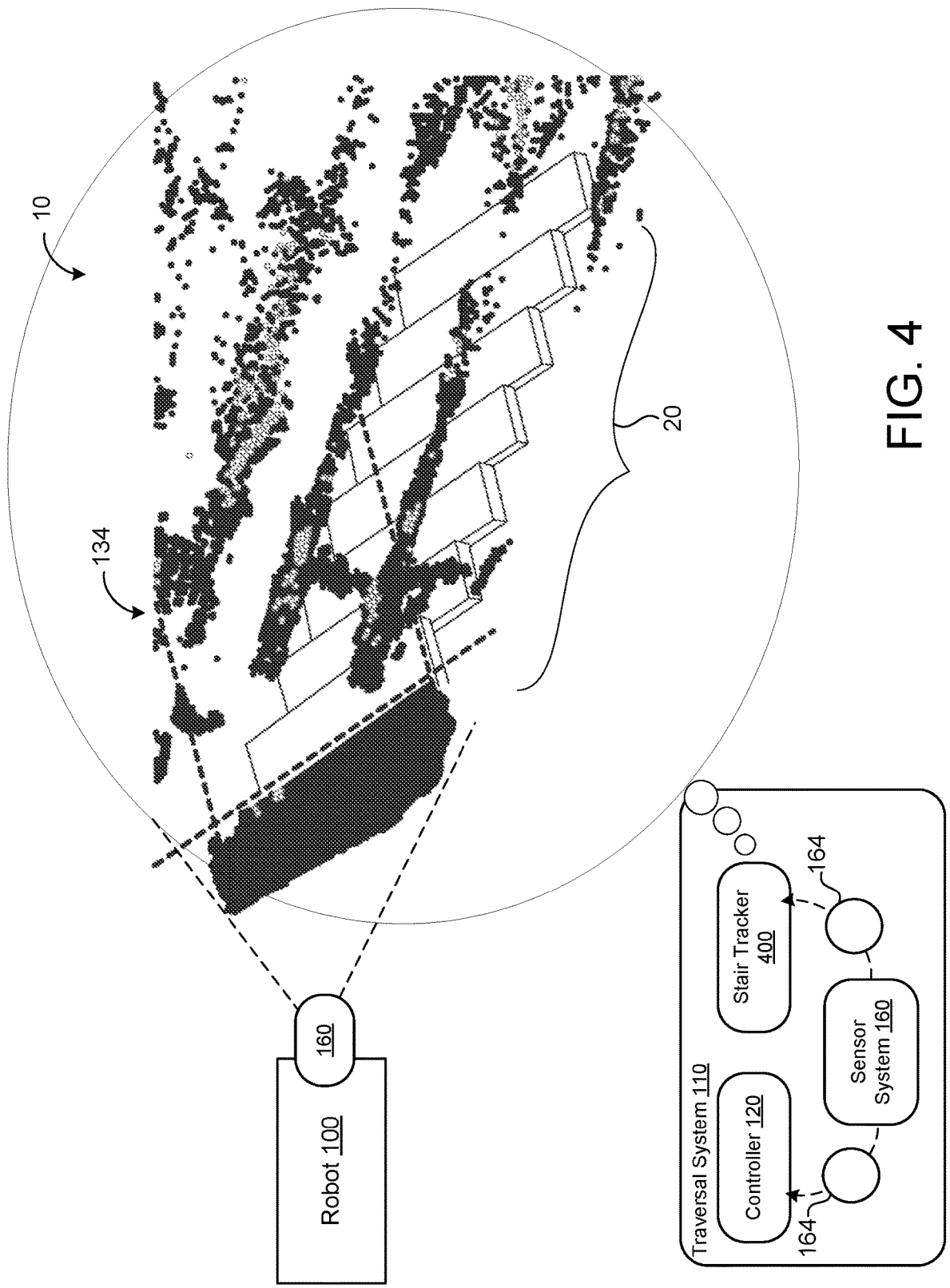
FIG. 4 is a schematic view of a stair tracker while the robot of FIG. 1A traverses the robotic environment.

Generally speaking, the robot 100 may not include many assumptions regarding a structure of the terrain in the environment 10. Without assumptions, systems of the robot 100 analyze sensor data 164 to determine a type of terrain in the environment 10. This approach may prove problematic for noisy sensor data 164 or more broadly speaking because there are a large number of terrain possibilities. In the case of stairs 20, stairs 20 often include known shapes such as, for example, treads 22, risers 24, and noses 26 that are based on building codes, ergonomic principles, or other construction traditions. In some configurations, the robot 100 utilizes the known shapes for stairs 20 and includes a stair tracker 400 as shown in FIG. 4. The stair tracker 400 is a system of the robot 100 that takes advantage of an assumption that stairs 20 exhibit a consistent structure. Based on structural assumptions for stairs 20, the stair tracker 400 is configured to receive the sensor data 164 and to try to fit its assumptions for stairs 20 to the sensor data 164. When the structural assumptions for stairs 20 fit the sensor data 164, the stair tracker 400 identifies the terrain corresponding to the sensor data 164 as stairs 20. In some examples, when stair tracker 400 identifies stairs 20 within the sensor data 164, the stair tracker 400 proceeds to determine further details about the stairs 20 from the sensor data 164. These details may include an exact orientation of the stairs 20 (e.g., with respect the robot 100), a depth "d" of each stair 20, a height "h" of each stair 20, etc. FIG. 4 depicts a point cloud of sensor data 164 (e.g., from a stereo camera) with set of stairs 20 imposed over the sensor data 164. Here, the stair tracker 400, by using an assumption that stairs 20 exist within the sensor data 164, identifies that the sensor data 164 has a point cloud pattern that resembles a pitch of a stair structure. This example illustrates that the stair tracker 400 may be advantageous to identify stairs 20 even with noisy sensor data 164 for the environment 10.

Figure 5:
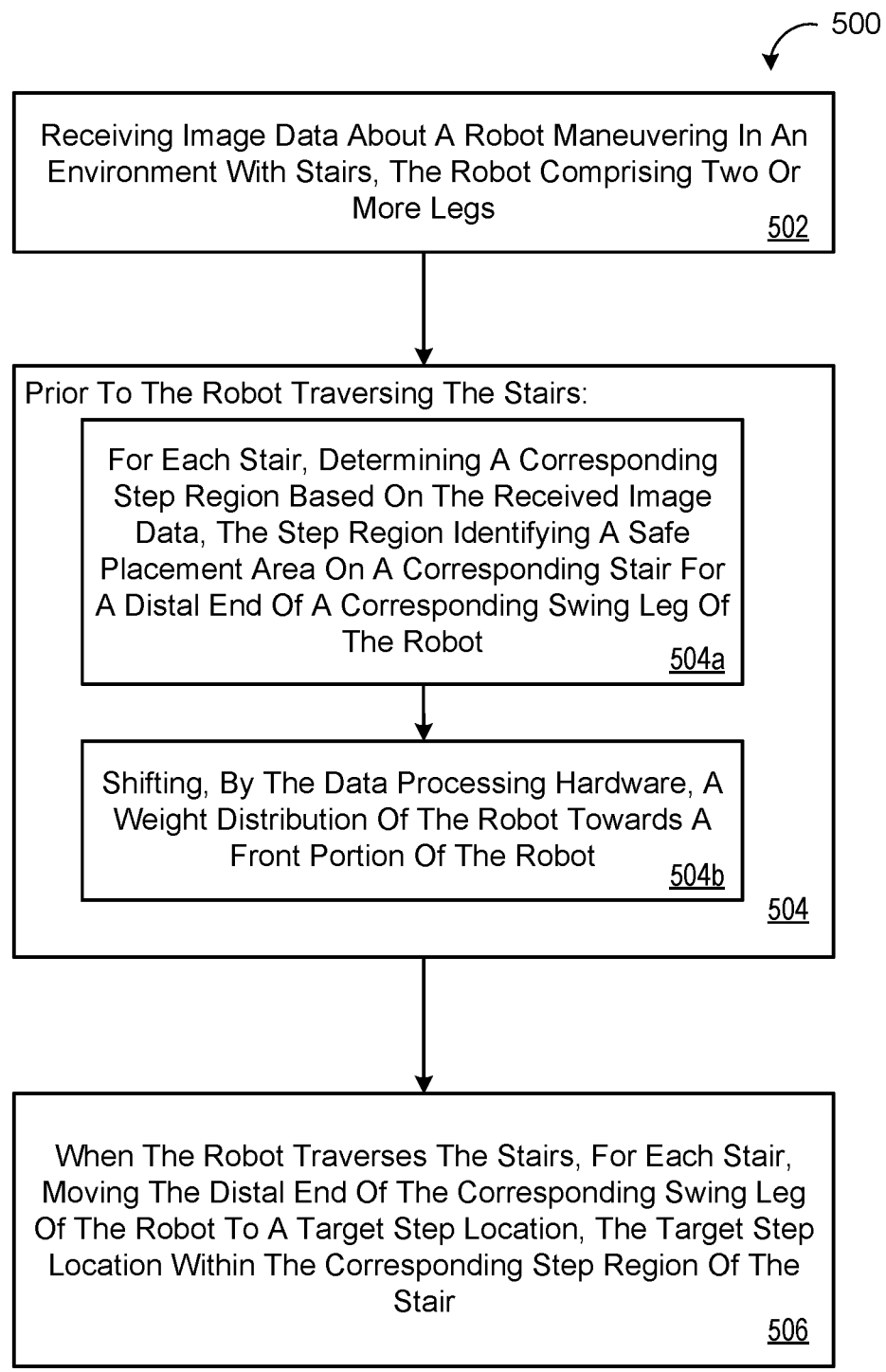
FIG. 5 is an example arrangement of operations for a robot to traverse a robotic environment.

FIG. 5 is an example of a method 500 of negotiating stairs 20. At operation 502, the method 500 receives image data 164 about a robot 100 maneuvering in an environment 10 with stairs 20. The robot 100 includes two or more legs 104. At operation 504, the method 500 performs operation 504a and operation 504b prior to the robot 100 traversing the stairs 20. At operation 504a, the method 500 determines, for each stair 20, a corresponding step region 220 based on the received image data 164. The step region 220 identifies a safe placement area on a corresponding stair 20 for a distal end 106 of a corresponding swing leg $104_{SW}$ of the robot 100. At operation 504b, the method 500 shifts a weight distribution of the robot 100 towards a front portion of the robot 100. At operation 506, when the robot 100 traverses the stairs 20, for each stair 20, the method 500 moves the distal end 106 of the corresponding swing leg $104_{SW}$ of the robot 100 to a target step location. The target step location is within the corresponding step region 220 of the stair 20.

FIG. 6 is schematic view of an example computing device 600 that may be used to implement the systems (e.g., the traversal system 110, the controller 120, the perception system 200, the impact detector 300, the stair tracker 400, etc.) of the robot 100 and methods (e.g., method 500) described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, a memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware of a robot causes the data processing hardware to perform operations comprising:
    receiving image data indicating that the robot is facing one or more stairs, the robot comprising a body, a front right leg, a front left leg, a rear right leg, and a rear left leg, each leg comprising:
        an upper leg portion;
        a lower leg portion; and
        a knee joint articulatably coupling the upper leg portion to the lower leg portion;
    prior to traversing the one or more stairs, establishing a stance pose for a front stance leg corresponding to one of the front right leg or the front left leg, the stance pose defining a stance angle between the body of the robot and an upper leg portion of the front stance leg; and
    while traversing the one or more stairs:
        causing shift of a weight distribution of the robot towards the front legs of the robot; and
        reducing the stance angle by positioning the knee joint of the front stance leg towards the body of the robot when the front stance leg is in contact with a tread of a stair of the one or more stairs.

2. The method of claim 1, wherein positioning the knee joint of the front stance leg towards the body of the robot changes the stance angle to a second stance angle between the body of the robot and the upper leg portion of the front stance leg and, at the second stance angle, the upper leg portion is more aligned with a longitudinal axis of the body of the robot than at the stance angle.

3. The method of claim 1, wherein positioning the knee joint of the front stance leg towards the body of the robot changes the stance angle to a second stance angle between the body of the robot and the upper leg portion of the front stance leg and, at the second stance angle, the upper leg portion is parallel with a longitudinal axis of the body of the robot.

4. The method of claim 1, wherein the operations further comprise:
    prior to traversing the one or more stairs, establishing a second stance pose for a rear stance leg corresponding to one of the rear right leg or the rear left leg, the second stance pose defining a third stance angle between the body of the robot and an respective upper leg portion of the rear stance leg; and
    while traversing the one or more stairs, increasing the third stance angle between the body of the robot and the respective upper leg portion of the rear stance leg to a fourth stance angle by positioning the knee joint of the rear stance leg away from the body of the robot, the rear stance leg in contact with a second tread of a second stair of the one or more stairs, the second stair different than the stair in contact with the front stance leg.

5. The method of claim 1, wherein the lower leg portion comprises a surface-engaging distal end and a proximal end opposite the surface-engaging distal end, the proximal end coupled to the upper leg portion at the knee joint, and wherein, when the surface-engaging end lifts-off from a respective tread of a corresponding stair, the lower leg portion of the leg rotates counter-clockwise about the knee joint towards the upper leg portion.

6. The method of claim 1, wherein traversing the one or more stairs comprises upwardly traversing the one or more stairs.

7. The method of claim 1, wherein the operations further comprise, while traversing the one or more stairs:
    detecting that a respective knee joint of a respective leg of the robot contacts an object behind the body of the robot; and
    based on the detection, moving the respective knee joint of the respective leg forward beneath the body of the robot.

8. The method of claim 1, wherein the operations further comprise, while traversing the one or more stairs:
    detecting an impact between a swing leg of the robot and a contralateral stance leg of the robot; and
    based on the detected impact, modifying a touchdown step location for the swing leg by shifting a distal end of the swing leg of the robot away from the contralateral stance leg of the robot.

9. The method of claim 1, wherein the operations further comprise, while traversing the one or more stairs:
    detecting a trip condition for a swing leg of the robot that causes instability of the robot; and
    based on the detected trip condition, elevating a distal end of the swing leg.

10. The method of claim 1, wherein the operations further comprise, prior to the robot traversing the stairs, selecting a movement controller for traversing the stairs with a fixed cadence.

11. A robot comprising:
    a body;
    four legs coupled to the body and configured to traverse an environment with stairs, the four legs comprising a front right leg, a front left leg, a rear right leg, and a rear left leg, each leg comprising:
        an upper leg portion;
        a lower leg portion; and
        a knee joint articulatably coupling the upper leg portion to the lower leg portion; and
    a movement controller in communication with the four legs, the movement controller comprising data processing hardware and memory hardware in communication with the data processing hardware, the memory hardware storing instructions that when executed on the data processing hardware cause the data processing hardware to perform operations comprising:
        receiving image data indicating that the robot is facing one or more stairs;
        prior to traversing the one or more stairs, establishing a stance pose for a front stance leg corresponding to one of the front right leg or the front left leg, the stance pose defining a stance angle between the body of the robot and an upper leg portion of the front stance leg; and
        while traversing the one or more stairs:
            causing shift of a weight distribution of the robot towards the front legs of the robot; and
            reducing the stance angle by positioning the knee joint of the front stance leg towards the body of the robot when the front stance leg is in contact with a tread of a stair of the one or more stairs.

12. The robot of claim 11, wherein positioning the knee joint of the front stance leg towards the body of the robot changes the stance angle to a second stance angle between the body of the robot and the upper leg portion of the front stance leg and, at the second stance angle, the upper leg portion is more aligned with a longitudinal axis of the body of the robot than at the stance angle.

13. The robot of claim 11, wherein positioning the knee joint of the front stance leg towards the body of the robot changes the stance angle to a second stance angle between the body of the robot and the upper leg portion of the front stance leg and, at the second stance angle, the upper leg portion is parallel with a longitudinal axis of the body of the robot.

14. The robot of claim 11, wherein the operations further comprise:
    prior to traversing the one or more stairs, establishing a second stance pose for a rear stance leg corresponding to one of the rear right leg or the rear left leg, the second stance pose defining a third stance angle between the body of the robot and an respective upper leg portion of the rear stance leg; and
    while traversing the one or more stairs, increasing the third stance angle between the body of the robot and the respective upper leg portion of the rear stance leg to a fourth stance angle by positioning the knee joint of the rear stance leg away from the body of the robot, the rear stance leg in contact with a second tread of a second stair of the one or more stairs, the second stair different than the stair in contact with the front stance leg.

15. The robot of claim 11, wherein the lower leg portion comprises a surface-engaging distal end and a proximal end opposite the surface-engaging distal end, the proximal end coupled to the upper leg portion at the knee joint, and
    wherein, when the surface-engaging end lifts-off from a respective tread of a corresponding stair, the lower leg portion of the leg rotates counter-clockwise about the knee joint towards the upper leg portion.

16. The robot of claim 11, wherein traversing the one or more stairs comprises upwardly traversing the one or more stairs.

17. The robot of claim 11, wherein the operations further comprise, while traversing the one or more stairs:
    detecting that a respective knee joint of a respective leg of the robot contacts an object behind the body of the robot; and
    based on the detection, moving the respective knee joint of the respective leg forward beneath the body of the robot.

18. The robot of claim 11, wherein the operations further comprise, while traversing the one or more stairs:
    detecting an impact between a swing leg of the robot and a contralateral stance leg of the robot; and
    based on the detected impact, modifying a touchdown step location for the swing leg by shifting a distal end of the swing leg of the robot away from the contralateral stance leg of the robot.

19. The robot of claim 11, wherein the operations further comprise, while traversing the one or more stairs:
    detecting a trip condition for a swing leg of the robot that causes instability of the robot; and
    based on the detected trip condition, elevating a distal end of the swing leg.

20. The robot of claim 11, wherein the operations further comprise, prior to the robot traversing the stairs, selecting a movement controller for traversing the stairs with a fixed cadence.

* * * * *